(12) United States Patent
Devassy et al.

(10) Patent No.: US 11,521,411 B2
(45) Date of Patent: Dec. 6, 2022

(54) SYSTEM AND METHOD FOR PROVIDING MULTI-CAMERA 3D BODY PART LABELING AND PERFORMANCE METRICS

(71) Applicant: Disney Enterprises, Inc., Burbank, CA (US)

(72) Inventors: Jayadas Devassy, Burbank, CA (US); Peter Walsh, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 243 days.

(21) Appl. No.: 17/076,922

(22) Filed: Oct. 22, 2020

(65) Prior Publication Data

US 2022/0129669 A1 Apr. 28, 2022

(51) Int. Cl.
*G06V 40/10* (2022.01)
*G06T 7/70* (2017.01)
(Continued)

(52) U.S. Cl.
CPC .............. *G06V 40/10* (2022.01); *G06T 7/292* (2017.01); *G06T 7/70* (2017.01); *G06V 10/82* (2022.01);
(Continued)

(58) Field of Classification Search
CPC ........ G06V 40/10; G06V 40/20; G06V 40/23; G06V 40/25; G06V 40/28; G06V 20/42; G06V 10/82; G06T 7/292; G06T 7/70–77; G06T 7/97; G06T 7/50–596; G06T 2207/10028; G06T 2207/30221; G06T 2207/30224; G06T 2207/30228;
(Continued)

(56) References Cited

U.S. PATENT DOCUMENTS 10,699,421 B1 * 6/2020 Cherevatsky .......... G06K 9/623
10,839,203 B1 * 11/2020 Guigues .................. G06T 7/251
(Continued)

OTHER PUBLICATIONS

Alexiadis, Dimitrios S., et al. "Fastdeformable model-based human performance capture and FVV using consumer-grade RGB-D sensors." Pattern Recognition 79 (2018): 260-278. (Year: 2018).*
(Continued)

*Primary Examiner* — Geoffrey E Summers
(74) *Attorney, Agent, or Firm* — McCormick, Paulding & Huber PLLC

(57) ABSTRACT

A system and method for providing multi-camera 3D body part labeling and performance metrics includes receiving 2D image data and 3D depth data from a plurality image capture units (ICUs) each indicative of a scene viewed by the ICUs, the scene having at least one person, each ICU viewing the person from a different viewing position, determining 3D location data and visibility confidence level for the body parts from each ICU, using the 2D image data and the 3D depth data from each ICU, transforming the 3D location data for the body parts from each ICU to a common reference frame for body parts having at least a predetermined visibility confidence level, averaging the transformed, visible 3D body part locations from each ICU, and determining a performance metric of at least one of the body parts using the averaged 3D body part locations. The person may be a player in a sports scene.

40 Claims, 20 Drawing Sheets

(51) Int. Cl.
G06T 7/292 (2017.01)
G06V 10/82 (2022.01)
G06V 40/20 (2022.01)
G06V 20/40 (2022.01)

(52) U.S. Cl.
CPC .............. *G06V 20/42* (2022.01); *G06V 40/23* (2022.01); *G06T 2207/10028* (2013.01); *G06T 2207/20084* (2013.01); *G06T 2207/30196* (2013.01); *G06T 2207/30221* (2013.01)

(58) Field of Classification Search
CPC . G06T 2207/30196; G06T 2207/20081; G06T 2207/20084
See application file for complete search history.

(56) References Cited

U.S. PATENT DOCUMENTS

| | | | | |
|---|---|---|---|---|
| 2009/0244309 | A1* | 10/2009 | Maison | A63F 13/06 348/222.1 |
| 2011/0210915 | A1* | 9/2011 | Shotton | G06V 40/103 345/157 |
| 2014/0270351 | A1* | 9/2014 | Hoof | G06T 7/251 382/103 |
| 2015/0199824 | A1* | 7/2015 | Kim | G06V 40/28 382/103 |
| 2016/0217325 | A1* | 7/2016 | Bose | G11B 27/17 |
| 2017/0086712 | A1* | 3/2017 | Mauro | A61B 5/7221 |
| 2018/0099201 | A1* | 4/2018 | Marty | A63B 24/0062 |
| 2021/0158032 | A1* | 5/2021 | Baek | G06V 40/23 |

OTHER PUBLICATIONS

Kaichi, Tomoya, et al. "Estimation of Center of Mass for Sports Scene Using Weighted Visual Hull." 2018 IEEE/CVF Conference on Computer Vision and Pattern Recognition Workshops (CVPRW). IEEE, 2018. (Year: 2018).*

Kasiri, Soudeh, et al. "Fine-grained action recognition of boxing punches from depth imagery." Computer Vision and Image Understanding 159 (2017): 143-153. (Year: 2017).*

"Introduction to SIFT (Scale-Invariant Feature Transform)", https://docs.opencv.org/master/da/df5/tutorial_py_sift_intro.html.

"Introduction to SURF (Speeded-Up Robust Features)", https://docs.opencv.org/master/df/dd2/tutorial_py_surf_intro.html.

"Template Matching", https://docs.opencv.org/master/d4/dc6/tutorial_py_template_matching.html.

Mallick, Satya, "Histogram of Oriented Gradients", https://www.learnopencv.com/histogram-of-oriented-gradients/.

Buric, Matija, et al., "Ball Detection Using Yolo and Mask R-CNN", Dec. 2018, Conference: 2018 International Conference on Computational Science and Computational Intelligence (CSCI).

Luces, Rean Neil, "Template-based versus Feature-based Template Matching", Nov. 16, 2019, Data Driven Investor, https://medium.com/datadriveninvestor/template-based-versus-feature-based-template-matching-e6e77b2a3b3a.

"Texture analysis using LBP", Aug. 26, 2018, Artificial Intelligence and Electronics Society (ArIES), https://medium.com/@ariesiitr/texture-analysis-using-lbp-e61e87a9056d.

Kathuria, Ayoosh, "What new in YOLO v3?", Apr. 23, 2018, Towards Data Science, https://towardsdatascience.com/yolo-v3-object-detection-53fb7d3bfe6b.

Hartley, Richard, et al., "Multiple View Geometry in Computer Vision", Cambridge University Press, Sect. 6.1, p. 155, "Camera rotation and translation".

Redmon, J. et al., "You Only Look Once" Unified, Real-Time Object Detection, May 9, 2016, Computer Science 2016 EEE Conference on Computer Vision and Pattern Recognition (CVPR).

"Camera matrix", Wikipedia, https://en.wikipedia.org/wiki/Camera_matrix.

"Color Histogram", Wikipedia, https://en.wikipedia.org/wiki/Color_histogram#:~:text=In%20image%20processing%20and%20photography,set%20of%20all%20possible%20colors.

Cheng, Bowen, et al., "HigherHRNet: Scale-Aware Representation Learning for Bottom-Up Human Pose Estimation", Mar. 12, 2020, Conference on Computer Vision and Pattern Recognition (CVPR), 2020.

"Simple Baselines for Human Pose Estimation and Tracking", Github, https://github.com/microsoft/human-pose-estimation.pytorch.

Xiao, B., et al., "Simple Baselines for Human Pose Estimation and Tracking", Aug. 21, 2018, European Conference on Computer Vision.

* cited by examiner

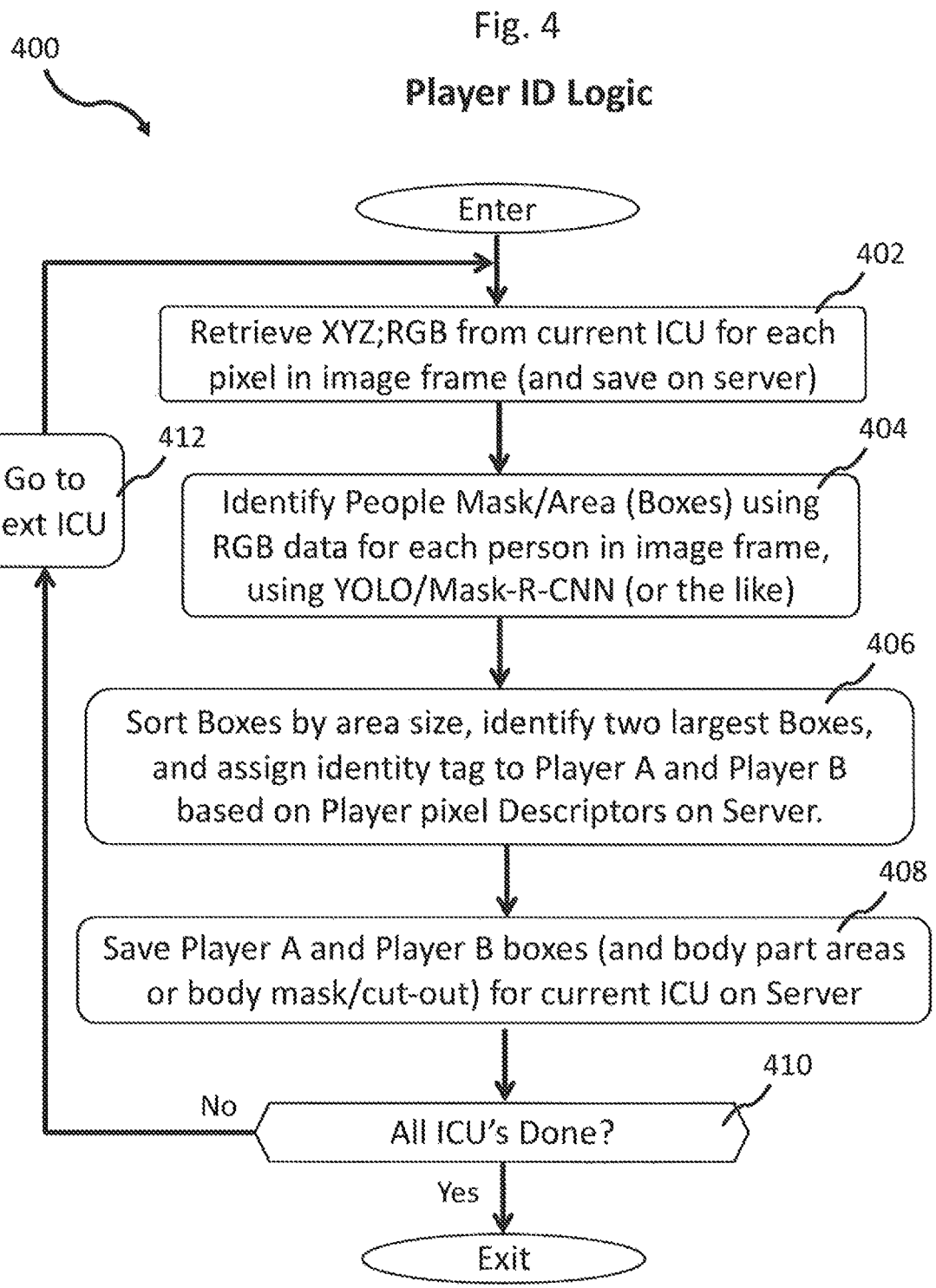

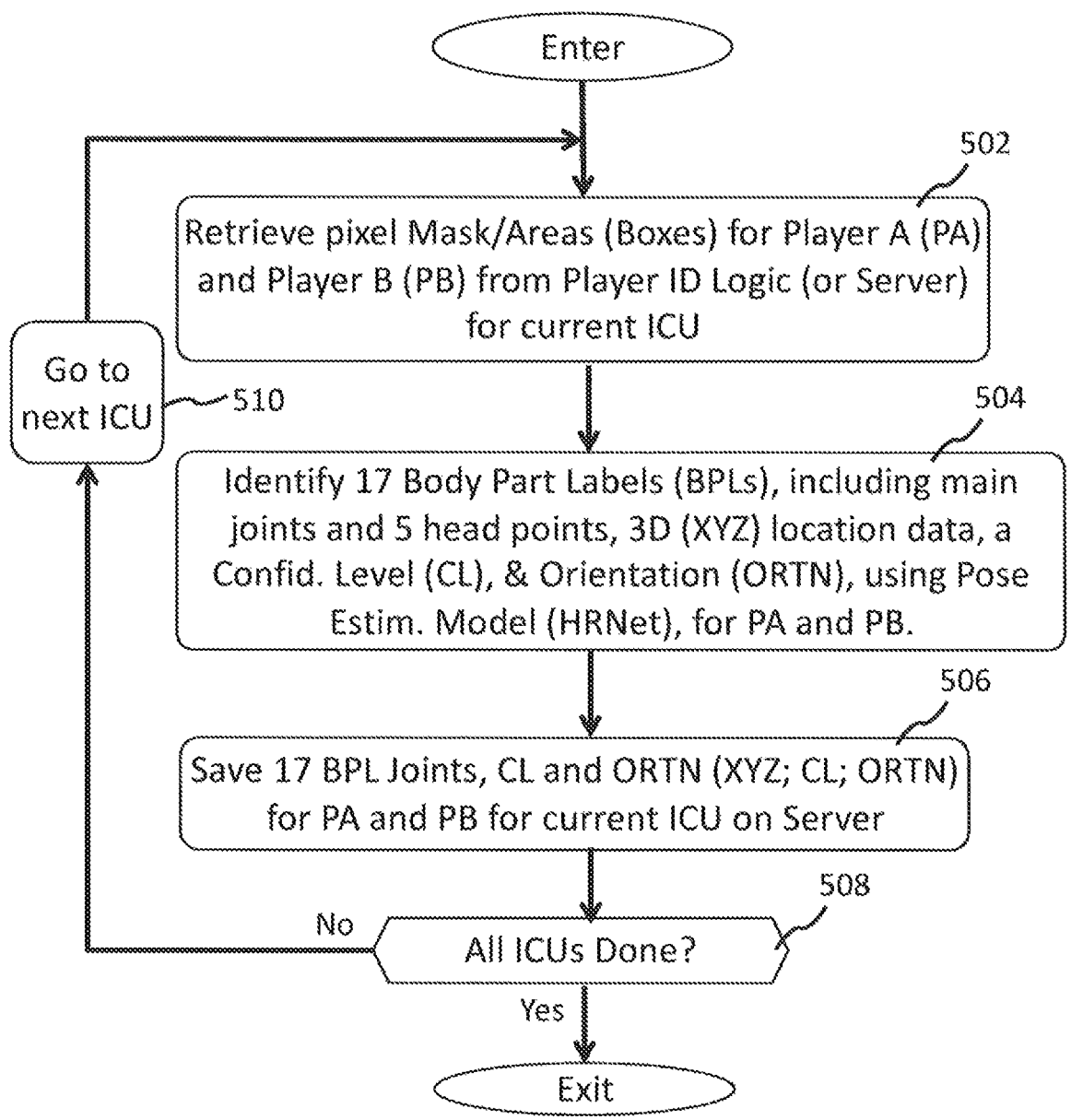

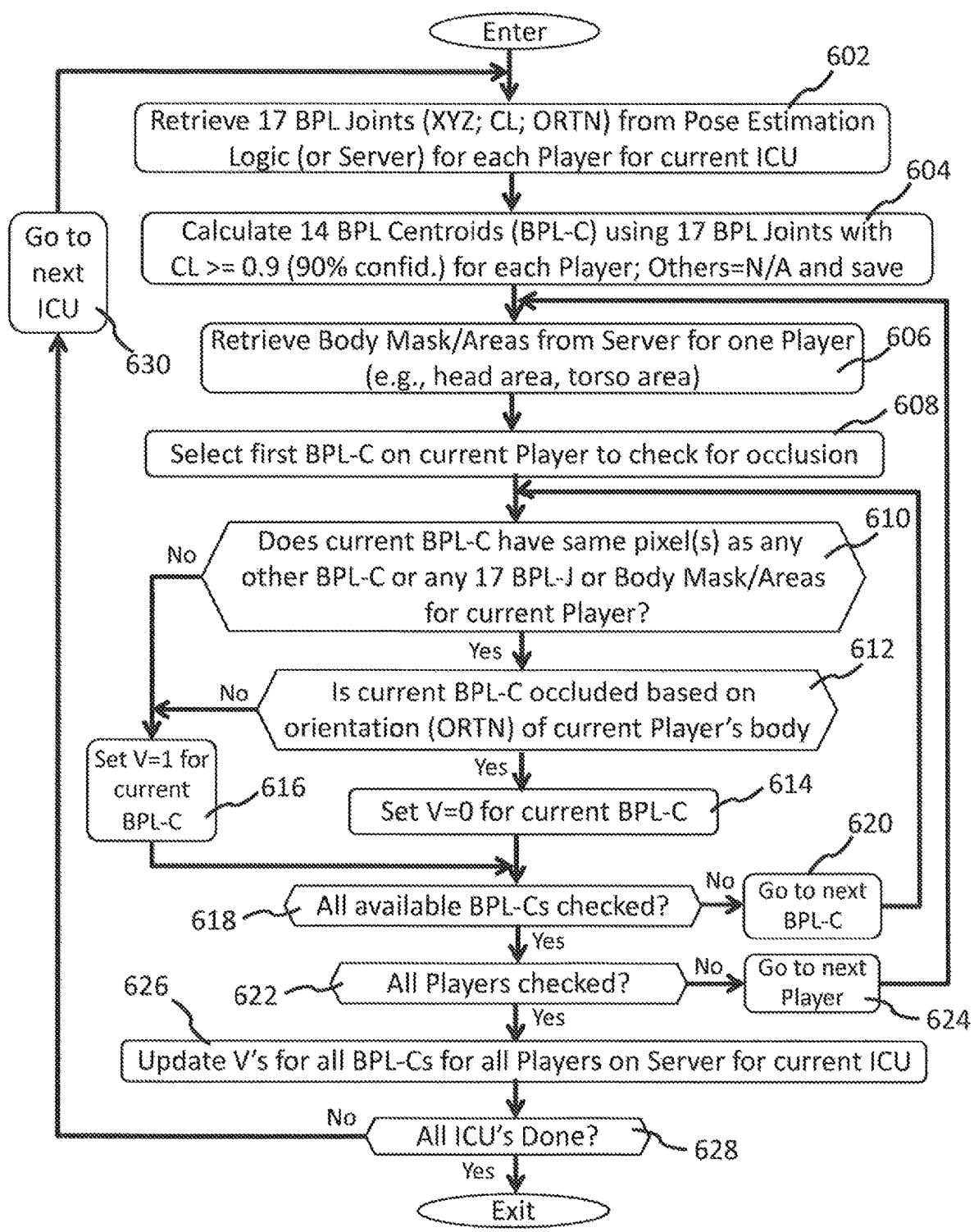

Centroid Calculation

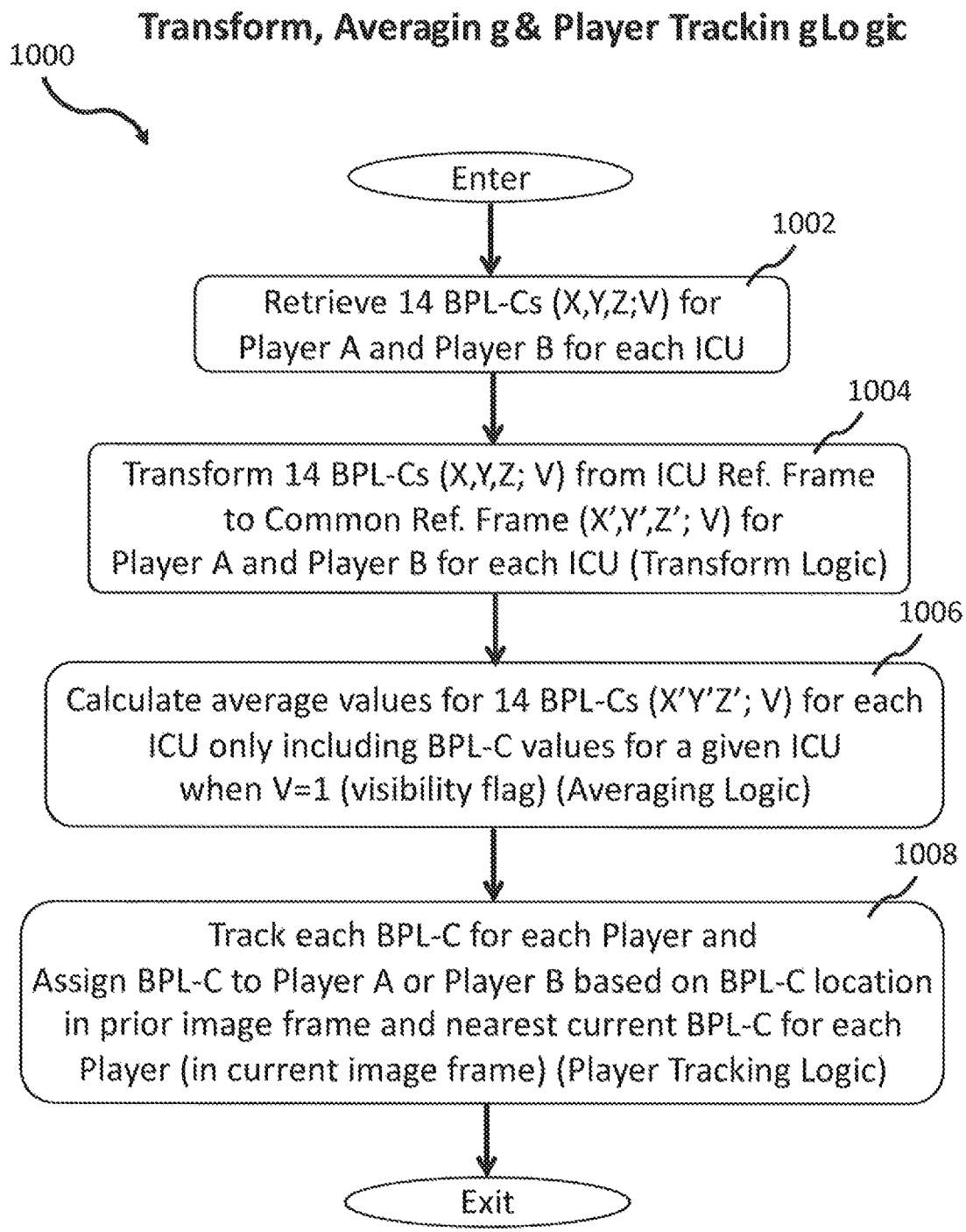

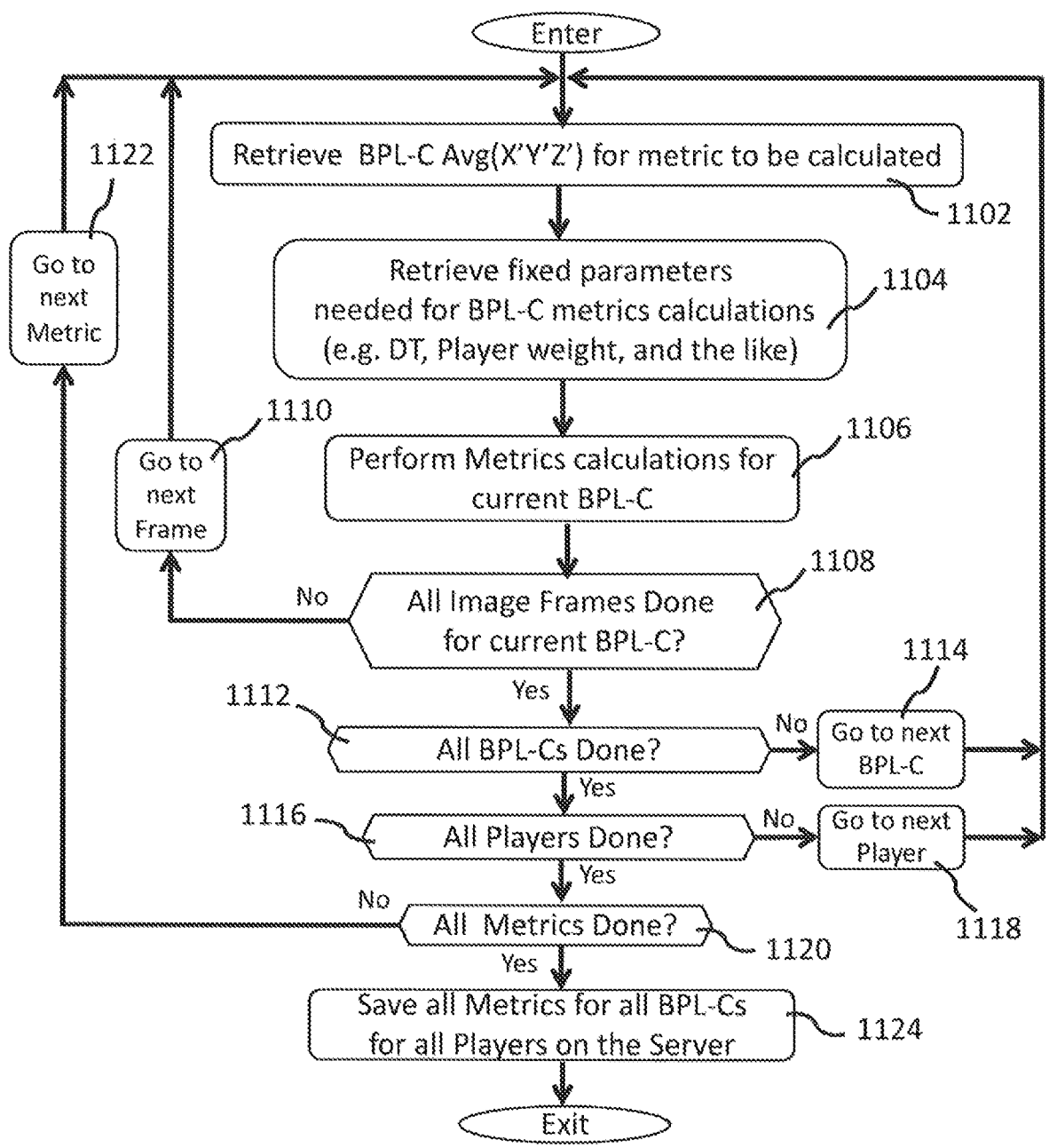

Fig. 12

| ICU # | Frame(n) | Player | BPL-C # | BPL Centroid | XYZ Coordinates (X, Y, Z) |
|---|---|---|---|---|---|
| ICU1 | Frame (1) | Player A (PA) | 1 | Head | -1.2624337673187256, -0.5329493880271912, 2.5188000202178955 |
| | | | 2 | Left Calf | -1.7196152210235596, 0.3275769352912903, 3.7170000076293945 |
| | | | 3 | Left Forearm | -0.6621721982955933, -0.11482961475849152, 1.2590000629425049 |
| | | | 4 | Left Foot | -1.8175129890441895, 0.4825292229652405, 3.9720001220703125 |
| | | | 5 | Left Thigh | -1.5371968746185303, 0.07574719935655594, 3.111999988555908 |
| | | | 6 | Left Upper Arm | -1.326195478439331, -0.3319149613380432, 2.493500232696533 |
| | | | 7 | Left Wrist | 0.0, 0.0, 0.0 |
| | | | 8 | Right Calf | -1.4792816638946533, 0.6290662288665771, 2.9060001373291016 |
| | | | 9 | Right Forearm | -1.1873044967651367, -0.1827830672264099, 2.4820001125335693 |
| | | | 10 | Right Foot | -1.4824367761611938, 0.7430765628814697, 2.807000160217285 |
| | | | 11 | Right Thigh | -1.4967703819274902, 0.2819450795650482, 2.830000162124634 |
| | | | 12 | Right Upper Arm | -1.3330480812072754, -0.2086120843887329, 2.496500015258789 |
| | | | 13 | Right Wrist | -1.1429780721664429, -0.28873932361602783, 2.440000057220459 |
| | | | 14 | Torso | -1.4320006370544434, -0.1867160201072693, 2.588750123977661 |
| | | Player B (PB) | 1 | Head | -0.4170297682285309, -0.4662765691280365, 3.020599842071533 |
| | | | 2 | Left Calf | -0.46423882246017456, 0.4811547398571997, 3.6540002822875977 |
| | | | 3 | Left Forearm | -0.2971302568912506, -0.12873336672782898, 3.1730000972747803 |
| | | | 4 | Left Foot | -0.4538949429988861, 0.7089318633079529, 3.7130000591278076 |
| | | | 5 | Left Thigh | -0.2948249744415283, 0.10520704835653305, 3.5890002250671387 |
| | | | 6 | Left Upper Arm | -0.20123952627182007, -0.21968723833569944, 3.248000144958496 |
| | | | 7 | Left Wrist | -0.37172195315361023, -0.16289018094539642, 3.124000072479248 |
| | | | 8 | Right Calf | 0.03503720462322235, 0.16628614068803131, 4.164000511169434 |
| | | | 9 | Right Forearm | -0.5567730665206909, -0.3969561755657196, 3.302000045776367 |
| | | | 10 | Right Foot | 0.14071713387966156, 0.2394159734249115, 4.4170002937316895 |
| | | | 11 | Right Thigh | -0.11918667703866959, 0.0014026761054992676, 3.686500072479248 |
| | | | 12 | Right Upper Arm | -0.4480474293231964, -0.428373634815216606, 3.2250001430511475 |
| | | | 13 | Right Wrist | -0.5092610716819763, -0.42673054337501526, 3.2220001220703125 |
| | | | 14 | Torso | -0.1885870414018631, -0.24191948771476746, 3.346750020980835 |
| | Frames (2) to (N) | Player A (PA) | 1 | Head | -1.2634337673187256, -0.5339493880271912, 2.5198000202178955 |
| | | | * * * | * * * | * * * |
| | | | 14 | Torso | -1.4330006370544434, -0.1868160201072693, 2.589750123977661 |
| | | Player B (PB) | 1 | Head | -0.4181297682285309, -0.4662765691280365, 3.022599842071533 |
| | | | * * * | * * * | * * * |
| | | | 14 | Torso | -0.1896870414018631, -0.24291948771476746, 3.347750020980835 |
| ICU2 | Frames (1) to (N) | Player A (PA) | 1 | Head | -1.2644337673187256, -0.5349493880271912, 2.5208000202178955 |
| | | | * * * | * * * | * * * |
| | | | 14 | Torso | -1.4340006370544434, -0.1887160201072693, 2.590750123977661 |
| | | Player B (PB) | 1 | Head | -0.4190297682285309, -0.4672765691280365, 3.023599842071533 |
| | | | * * * | * * * | * * * |
| | | | 14 | Torso | -0.1906870414018631, -0.24391948771476746, 3.348750020980835 |
| ... Other ICUs | Frames (1) to (N) | Player A (PA) | 1 | Head | -1.2654337673187256, -0.5359493880271912, 2.5218000202178955 |
| | | | * * * | * * * | * * * |
| | | | 14 | Torso | -1.4350006370544434, -0.1897160201072693, 2.591750123977661 |
| | | Player B (PB) | 1 | Head | -0.4200297682285309, -0.4682765691280365, 3.024599842071533 |
| | | | * * * | * * * | * * * |
| | | | 14 | Torso | -0.1916870414018631, -0.24491948771476746, 3.349750020980835 |
| ICUM | Frames (1) to (N) | Player A (PA) | 1 | Head | -1.2664337673187256, -0.5369493880271912, 2.5228000202178955 |
| | | | * * * | * * * | * * * |
| | | | 14 | Torso | -1.4360006370544434, -0.1907160201072693, 2.592750123977661 |
| | | Player B (PB) | 1 | Head | -0.4210297682285309, -0.4692765691280365, 3.025599842071533 |
| | | | * * * | * * * | * * * |
| | | | 14 | Torso | -0.1926870414018631, -0.24591948771476746, 3.350750020980835 |

Fig. 13
Velocity Calculation Table

DT = 1/60 Sec

| Player | BPL-C # | BPL Centroid | Frame(n) | X'avg(n) | Y'avg(n) | Z'avg(n) | Dist (n-1 to n) | Velocity @ Frame(n); Vel=Dist/DT |
|---|---|---|---|---|---|---|---|---|
| Player A | 1 | Head | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |
| | 2 | Left Calf | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |
| | 3 to 14 | Left Forearm to Torso | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |
| Player B | 1 | Head | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |
| | 2 | Left Calf | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |
| | 3 to 14 | Left Forearm to Torso | 1 | X'avg(1) | Y'avg(1) | Z'avg(1) | N/A | N/A |
| | | | 2 | X'avg(2) | Y'avg(2) | Z'avg(2) | Dist [XYZ(1) to XYZ(2)] | Vel (2) |
| | | | 3 | X'avg(3) | Y'avg(3) | Z'avg(3) | Dist [XYZ(1) to XYZ(2)] | Vel (3) |
| | | | 4 | X'avg(4) | Y'avg(4) | Z'avg(4) | Dist [XYZ(2) to XYZ(3)] | Vel (4) |
| | | | 5 | X'avg(5) | Y'avg(5) | Z'avg(5) | Dist [XYZ(3) to XYZ(4)] | Vel (5) |
| | | | ... | ... | ... | ... | ... | ... |
| | | | N | X'avg(N) | Y'avg(N) | Z'avg(N) | Dist [XYZ(N-1) to XYZ(N)] | Vel (N) |

2D Optical Camera Image

3D Point Cloud Depth Image

SYSTEM AND METHOD FOR PROVIDING MULTI-CAMERA 3D BODY PART LABELING AND PERFORMANCE METRICS

BACKGROUND

In combat sports, such as boxing, martial arts, mixed martial arts, and kick boxing, measurement of athlete performance using sensing technology has the potential to enable advanced insights into an athlete's performance. Such measurement requires the determining of the three dimensional (3D), e.g., X, Y, Z, location in space of specific body parts (semantic segmentation) of the athlete, especially when certain body parts are blocked (or occluded) from camera view, e.g., by the athlete's body, another athlete's body, an official/referee, or other occluding object/person.

Current techniques for semantic segmentation, such as use of two-dimensional images or video, do not provide the necessary data and do not account for such occlusions, causing the measured data to be unusable to accurately and repeatably measure an athlete's performance or metrics, especially when the athletes are close to each other, such as in boxing, martial arts, or other sports.

Accordingly, it would be desirable to have a system and method that overcomes the shortcomings of the prior art and provides an accurate and robust approach to measuring athlete performance in three dimensions (or 3D).

BRIEF DESCRIPTION OF THE DRAWINGS

FIG. 4 is a flow diagram of Player ID Logic, in accordance with embodiments of the present disclosure.

FIG. 5 is a flow diagram of Pose Estimation Model Logic, in accordance with embodiments of the present disclosure.

FIG. 6 is a flow diagram of Centroid & Visibility/Occlusion Logic, in accordance with embodiments of the present disclosure.

FIG. 10 is a flow diagram of Transform, Averaging & Player Tracking Logic, in accordance with embodiments of the present disclosure.

FIG. 11 is a flow diagram of Metrics Calculation Logic, in accordance with embodiments of the present disclosure.

FIG. 12 is a table showing sample (XYZ) data values for 14 BPL Centroids for Player A and Player B, for N Frames, for M ICUs, in accordance with embodiments of the present disclosure.

FIG. 13 is a table showing a velocity calculation table for 14 BPL Centroids for Player A and Player B, for N Frames, in accordance with embodiments of the present disclosure.

DETAILED DESCRIPTION

Figure 1:
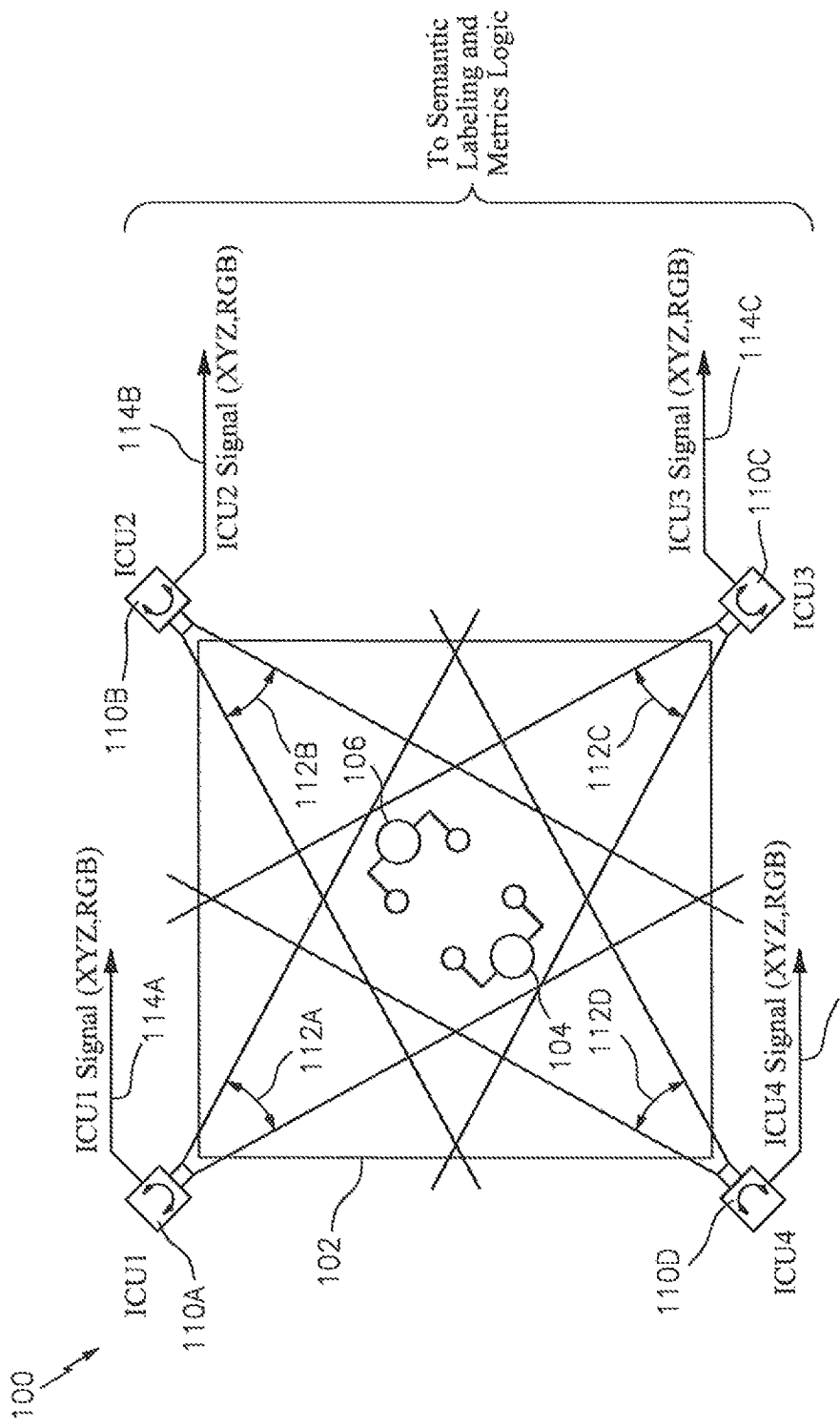
FIG. 1 is an aerial view of a sports (boxing/martial arts/wrestling) ring with two boxers and four 2D/3D image capture units, providing four different views of two boxers, in accordance with embodiments of the present disclosure.

As discussed in more detail below, in some embodiments, the system and method of the present disclosure provides multi-camera 3D semantic body part labeling and performance metrics calculation of athletes, or any moving people in a scene (or predefined area), with accurate full semantic labeling of the entire set of three-dimensional (3D) data. The present disclosure utilizes a novel transfer or mapping of the semantic labeling from the 2D image space to the 3D space of 3D XYZ data points. The 3D XYZ data is semantically labeled by identifying semantically isolated regions and associating the regions (or collection of pixels) with body part labels (BPLs).

The present disclosure provides semantic segmentation on a 2D image from the ICUs, which results in semantic labels for each pixel in an image. Each pixel data from the ICUs also has 3D depth data (or point cloud) associated with it. The ICUs may also each be calibrated, registered or aligned such that data from the ICUs associated with each pixel has both image (RGB) data and accurate 3D depth data (XYZ). This allows 2D video images (captured by the ICUs) from one or more views of an athlete to be combined with real-time 3D depth data (also captured by the ICUs).

Regions of the 3D scene that are occluded (or blocked) in one view may be labeled using a different ICU/camera view in which the occlusion is not present. As a result, a more complete semantic labeling of the 3D data can be achieved than would be possible using a single camera view. The multiple ICU/camera views may be combined to generate a 3D pose of each athlete. This may be a skeletal pose or a 3D point cloud or a complete three dimensional creation of the athlete itself. Such poses can be labeled using transferred semantical labeling and then tracked over time to generate analytical or performance data of the athlete. Such semantic analysis of the data can be used to identify and track objects and derive various analytics.

The 3D (XYZ) semantically labeled body parts or body part labels (BPLs) can be analyzed for athlete's (or person's) location, velocity, pose, power, contact between objects/body parts, energy transferred upon contact, balance, positioning, "effective aggression" (e.g., consistently landing punches and avoiding punches from opponent), "ring generalship" (or ring control or control of the ring during a bout by, e.g., initiating exchanges and causing opponent to adjust), or other performance metrics of the athlete. Such 3D labeling is significant for the many analytic analyses that can be performed to characterize the performance of the individual athletes, such as those listed above, and may be applied to many different sports.

The image capture units (ICUs) may be a combination of a video camera which provides 2D digital image and a 3D depth-sensing device/sensors that can accurately measure the XYZ distance, both viewing the same location. It produces a digital output data for each pixel in the image having both 2D image data (RGB) and 3D XYZ coordinate data (see FIGS. 8A and 8B).

The image capture units (ICUs) may use sensing technologies such as optical, video, lidar or radar to produce raw information regarding 3D distance/location, which can then be processed and analyzed to determine derived measures or metrics of the athlete. The ICUs may be high capture rate cameras (e.g., 60 frames per second), together with structured-light 3D scanners, having high sensitivity visual capture. Other capture rates may be used if desired provided it provides the desired function and performance described herein. Also, the number of ICUs positioned around perimeter of the ring (or sports arena) may be any number greater than one (1), e.g., 2, 3, 4, 6, 8, 12, 16, 32, or more or any other number of ICUs, to provide simultaneous alternate views of the players in the scene to accurately determine full 3D pose, body part labeling, and metrics. In general, the greater the number of ICUs the better the determination of occlusions and the better the body part visibility.

Thus, the present disclosure provides semantic labeling of three-dimensional 3D points of data which is then used to derive analytics that may be used to create insights or stories or metrics about an athletes' performance. The metrics may be derived from specific combinations of data captured via the multiple ICUs.

The present disclosure uses 2D image representation (RGB) along with the significant amount of known 2D image training data to effectively and efficiently identify regions where people exist in the 2D image space and uses 3D XYZ data to identify pose/body parts of the people in the image. In particular, the present disclosure uses known machine learning models/tools (e.g., YOLO/Mask R-CNN or the like, discussed hereinafter) trained on a significant amount of the 2D-labeled image data, together with known pose estimation models (e.g., HRNet or the like, discussed hereinafter) which is trained using pose image data to provide semantic body part labels (BPLs), such as main joints and head points, and regions/areas/masks for body parts or regions, such as the torso, head, and other body parts, or a full-body "cutout" of all parts, for the people in the image.

Figure 8A:
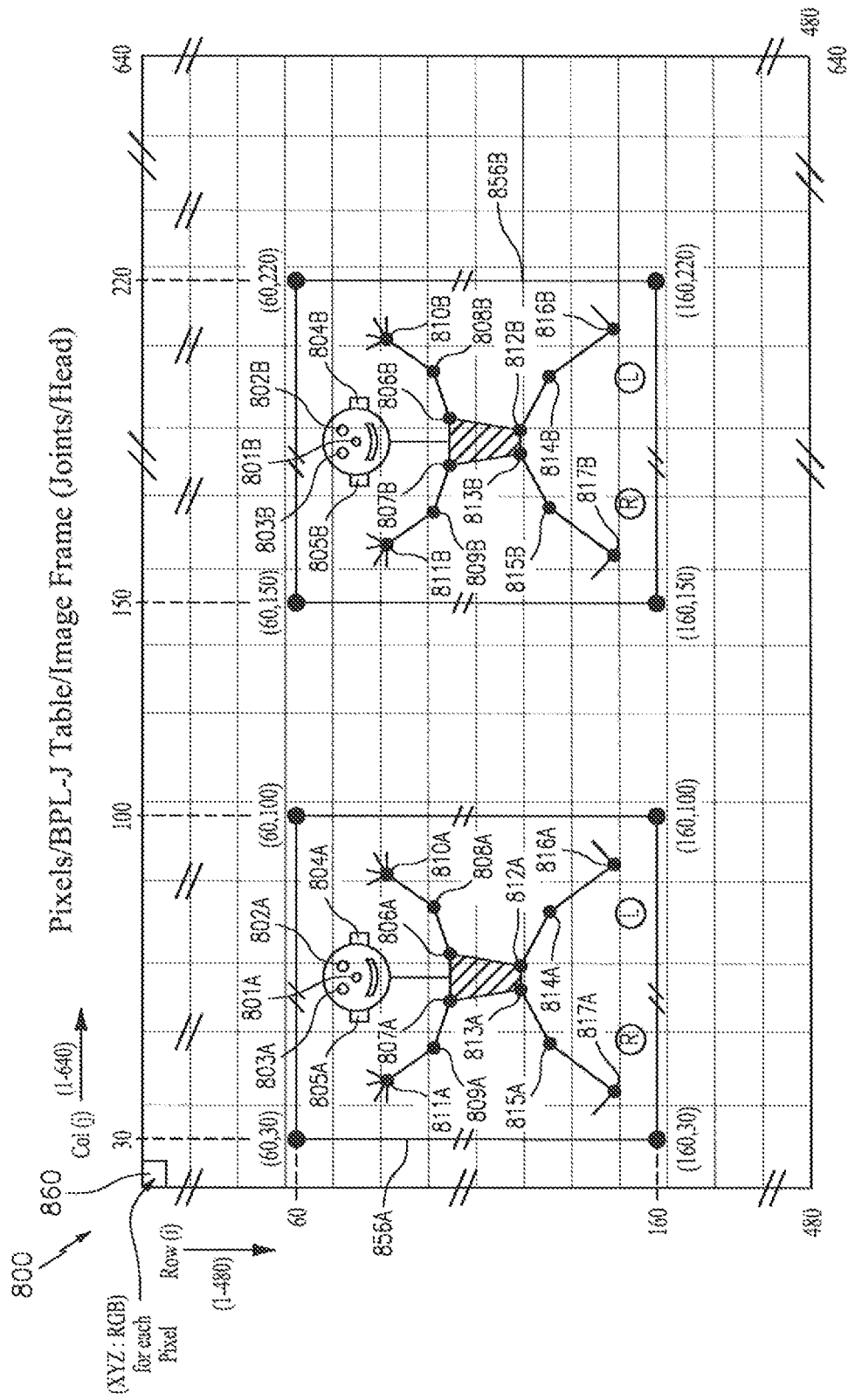
FIG. 8A is a diagram of a pixel matrix/table showing pixel boxes and Body Part Label Joints (BPL-Js), in accordance with embodiments of the present disclosure.
Figure 8B:
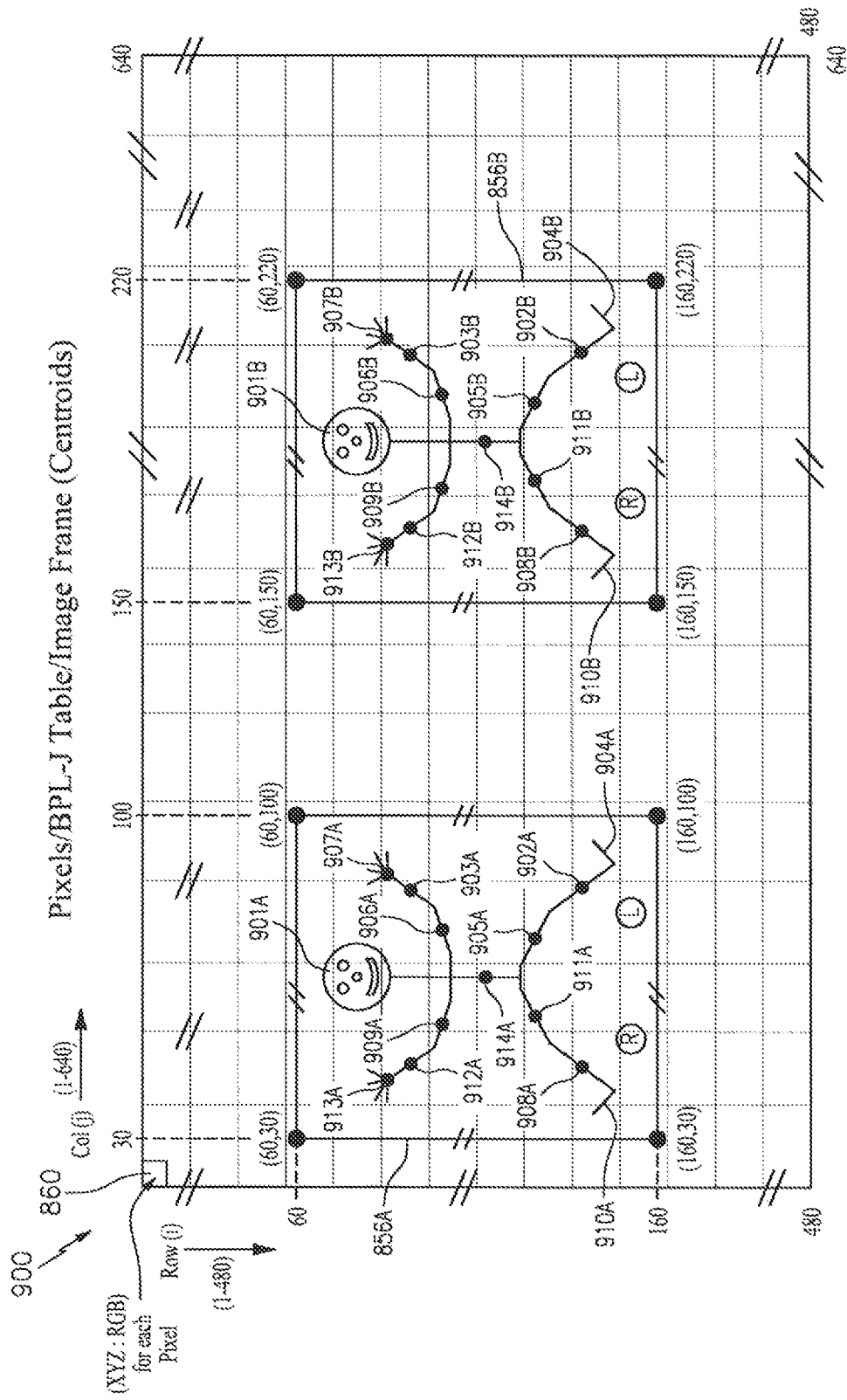
FIG. 8B is a diagram of a pixel matrix/table showing pixel boxes and Body Part Label Centroids (BPL-Cs), in accordance with embodiments of the present disclosure.

The 2D images/videos are generated using calibrated ICUs/cameras, which provide accurate mapping from 3D coordinates to 2D image coordinates (pixel frame), thereby providing a 2D pixel grid (or table or matrix) having both 2D RGB and 3D XYZ depth data for each pixel or each cell of the table/matrix (see FIGS. 8A, 8B). Thus, the present disclosure provides semantic labeling of each pixel in the 2D image and "projects" each of the 3D XYZ depth data points onto the 2D image plane. The 2D semantic label is "attached" to the 3D data point by analyzing the occlusion or the visibility of body parts and multiple views to provide a semantically labeled 3D data, which is then used to determine the metrics of the athlete.

The system and method of the present disclosure may be used to detect the pose, actions or metrics of any body parts of any person or persons in an image frame in any scene.

Referring to FIG. 1, an aerial view 100 of a boxing ring 102 is provided with two boxers, 104, 106, and four 2D/3D video cameras (or image capture units or ICUs) 110A, 110B, 110C, 110D (collectively, the cameras or ICUs 110), each ICU having a respective field of view 112A, 112B, 112C, 112D (collectively, field of view 112A) of the ring 102. The Image Capture Units (ICUs) 110 may be any 2D/3D video cameras, e.g., an Intel® RealSense™ camera, made by Intel Corp., such as Intel® RealSense™ Depth Camera SR305 (2016) or Intel® RealSense™ LiDAR Camera L515 (2019), or the like, that provide the functions and performance described herein.

Any ICU capable of providing the 2D/3D data described herein may be used if desired. Each of the ICUs 110 may be mounted to a stationary stand (or tripod) located at the corners of the ring 102, and may pan, tilt, or zoom (PTZ) as needed to capture images of the desired people/athletes (or objects) in the ring 102 in the respective ICU's field of view. The ICUs 110 each provide a video or ICU output signal on lines 114A, 114B, 114C, 114D, respectively (collectively 114) to Semantic Labeling and Metrics Logic 120, discussed more hereinafter with FIG. 2. The ICUs 110 each provide a 2D color image (RGB) data and 3D location data (XYZ) as the ICU output signals for each image frame in the ICUs field of view, each frame having a size, e.g., 640 pixels by 480 pixels, each pixel having a 3D spatial and 2D image information (X,Y,Z; R,G,B), where X,Y,Z are the 3D coordinates in space and R,G,B, are the Red, Green, Blue color 2D image data associated with each pixel in the ICU image frame.

Figure 2:
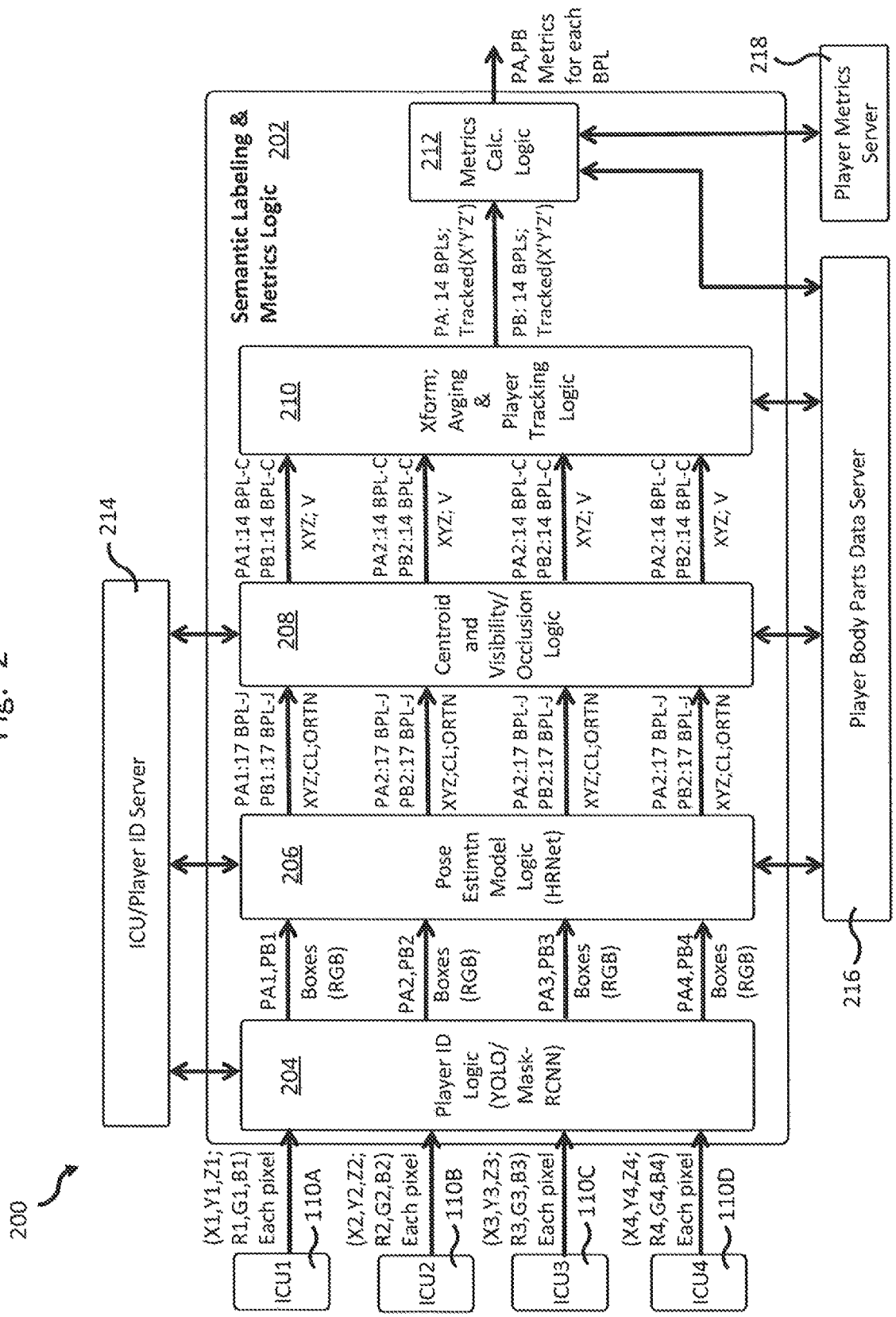
FIG. 2 is a top-level block diagram showing components of a system for providing multi-camera 3D body part labeling and performance metrics, in accordance with embodiments of the present disclosure.

FIG. 2 illustrates various components (or devices or logic) of a system and method 200 for multi-camera, 3D body part labeling and performance metrics calculation, including Semantic Labeling & Metrics Logic 202, which includes ICU/Player ID Logic 204, Pose Estimation Model Logic 206, Centroid & Visibility/Occlusion Logic 208, Transform/Averaging & Player Tracking Logic 210, and Metrics Calculation Logic 212. The Player ID Logic 204 receives digital data from the 2D/3D Image Capture Units (ICU1-ICU4) 110A-110D, where each pixel in each image from each ICU may have a format of X,Y,Z; R,G,B, as described herein. The Player ID Logic 204 may also store the data for each pixel in the image frame received from each ICU onto an ICU/Player ID Server 214, e.g., in a 2D (row(i),column(j)), e.g., 480 rows×640 columns of pixels, table or matrix format, where each cell in the table represents a pixel, such as pixels 860 shown in FIG. 8A (discussed more hereinafter). In some embodiments, the ICUs may store the 2D/3D image frame data (XYZ; RGB) directly on the ICU/Player ID Server 214.

The Player ID Logic 204 uses the 2D RGB data from the image and known machine learning models/tools, such as YOLO/Mask R-CNN (discussed hereinafter) or the like, which are trained on a significant amount of the 2D-labeled data to identify people and objects, to provide people pixel boxes (or "bounding boxes", e.g., from YOLO) in the image frame indicative of where people are located in the image, as well as regions or areas or masks for the entire body (or full-body cutout), including body part areas such as the torso and head, which may be provided as a collection or cluster or set of pixels (e.g., from Mask R-CNN), which are not labeled as specific body parts. The Player ID Logic 204 organizes the people pixel boxes from smallest to largest and identifies the two largest boxes (closest people or Players to the camera), such as the people pixel boxes 705A, 705B shown in FIGS. 7 and 8, and assigns them to Player A and Player B based on corresponding predetermined pixel pattern descriptors (or identifiers or feature vectors) for Player A and Player B stored on the server 214 (as discussed herein regarding camera calibration and setup), for each ICU, discussed more hereinafter. It does this for each of the ICUs 110A-110D. Thus, the Player ID Logic 204 provides Player A and Player B for ICU1 (PA1, PB1), Player A and Player B for ICU2 (PA2, PB2), Player A and Player B for ICU3 (PA3, PB3), and Player A and Player B for ICU4 (PA4, PB4). The people boxes include both the RGB image data as well as the XYZ 3D depth data for each pixel for each player from each ICU. Thus, the Player ID Logic 204 assigns player identities consistently and accurately across multiple ICU units, with the same physical player being denoted A (or B) accordingly, regardless of ICU viewpoint.

The predetermined pixel pattern descriptors (or identifiers) for Player A and Player B may be stored on the ICU/Player ID Server 214 during camera calibration and setup performed just before (or at the beginning of) the match or event where the system of the present disclosure is intended to be used. In particular, player pixel descriptor generation may be done by having the ICUs (or other digital cameras) capture multiple digital still images of each of the players from different perspectives and different positions on the playing surface. Then, a computer system may execute a known software application or algorithm to analyze the digital images to determine (or "construct") specific pixel "descriptors" (identifiers) for each player.

Various known software applications or algorithms may be used to compute or determine or generate the desired predetermined player pixel descriptor for each player, as discussed more below. In particular, OpenCV is a known, freely-available product/tool that may implement such techniques, which are described below in more detail. The descriptors may be generated and stored on the Server 214 just before (or at the beginning of) the match or event, when the individual cameras within the ICUs are also calibrated. Both camera calibration and player pixel descriptor generation may be considered standard operating or setup procedure to be conducted just before or at the beginning of each match or event.

More specifically, a first technique that may be used to generate the predetermined player pixel descriptor for each player is a combination of Color Histograms and Texture-based Descriptors. Color histograms are described in: https://en.wikipedia.org/wiki/Color_histogram#:~: text=In%20image%20processing%20and%20photography, set%20of%20a11%20possible%20colors.; and Texture-based Local Binary Pattern is described in: https:// medium.com/@ariesiitr/texture-analysis-using-lbp-e61e87a9056d. Color histograms may be generated by "quantizing" or "binning" the range of possible values for the RGB channels of an image or screen area and then counting the number of pixels that fall into those ranges or bins. Texture descriptors capture the nature of color intensity changes centered around a particular point in the image. Taken together, they can be used as unique identifier or descriptor for an object or person (e.g. Player A or Player B), and can then be used to detect that object or person in a video frame or image.

Another known technique that may be used to generate the predetermined player pixel descriptor is Template Matching, which is described in: https://docs.opencv.org/master/d4/dc6/tutorial_py_template_matching.html. This is also a standard approach in Computer Vision. Template matching works using cross-correlation or normalized cross-correlation as described in the above link.

Another known technique that may be used to generate the predetermined player pixel descriptor is Feature-based Searching, which is described in: https://medium.com/data-driveninvestor/template-based-versus-feature-based-template-matching-e6e77b2a3b3a. Feature-based matching works by extracting features using a feature-extracting algorithm, such as any of those listed below for SIFT (Scale-Invariant Feature Transform), SURF (Speeded-Up Robust Features), or HOG (Histogram of Oriented Gradients): SIFT: https://docs.opencv.org/master/da/df5/tutorial_py_sift_intro.html SURF: https://docs.opencv.org/master/df/dd2/tutorial_py_surf intro.html HOG: https://www.learnopencv.com/histogram-of-oriented-gradients/

Once a feature-extraction algorithm is selected, the player digital pixel descriptor for each player may be computed. Then, when needed by the system of the present disclosure, the descriptor may be searched for the closest match in any given video frame to identify the players in the image. The player pixel descriptors also allow the system of the present disclosure to ignore non-players in the image frame, such as a referee, official, spectator, coach or the like, even if they are close to the camera, i.e., one of the largest pixel boxes in the image.

The Pose Estimation Model Logic 206 uses the 2D RGB data for Player A and Player B and a known pose estimation model, such as HRNet or the like, to provide semantic labeling, e.g., body part labels (BPL-Js), such as main joints and head points, and a Confidence Level (CL) and body Orientation (ORTN) for each player (PA, PB) for each ICU. The pose estimation model provides a pixel location (row-i, column-j) (or set of pixels) for a particular body part, which corresponds to 3D (XYZ) location data for that body part using the same pixel coordinates (i, j), which may be stored in a table such as pixel Table 800 of FIG. 8A.

Thus, the Pose Estimation Model Logic 206 provides 17 BPL-Js, CL and ORTN (XYZ; CL; ORTN) for Player A (PA) and Player B (PB) for each ICU as follows:
 for PA and PB for ICU1:
 PA1:17 BPL-Js (X1(n),Y1(n),Z1(n); CL1(n); ORTN);
 PB1:17 BPL-Js (X1(n),Y1(n), Z1(n); CL1(n); ORTN);
 for PA and PB for ICU2:
 PA2:17 BPL-Js (X2(n),Y2(n),Z2(n); CL2(n); ORTN);
 PB2:17 BPL-Js (X2(n),Y2(n),Z2(n); CL2(n); ORTN);
 for PA and PB for ICU3:
 PA3:17 BPL-Js (X3(n),Y3(n),Z3(n); CL3(n); ORTN);
 PB2:17 BPL-Js (X3(n),Y3(n),Z3(n); CL3(n); ORTN);
 and
 for PA and PB for ICU4:

PA4:17 BPL-Js (X4(n),Y4(n),Z4(n); CL4(n); ORTN);
PB4:17 BPL-Js (X4(n),Y4(n),Z4(n); CL4(n); ORTN),
where n is the BPL Joint of interest (n=1 to 17, for 17 joints/head). The results of the Pose Estimation Model Logic 206, including the 17 BPLs, CL and ORTN (XYZ; CL; ORTN) for Player A and Player B for each ICU may be stored in a Player Body Parts Data Server 216, or in another storage location.

Figure 9:
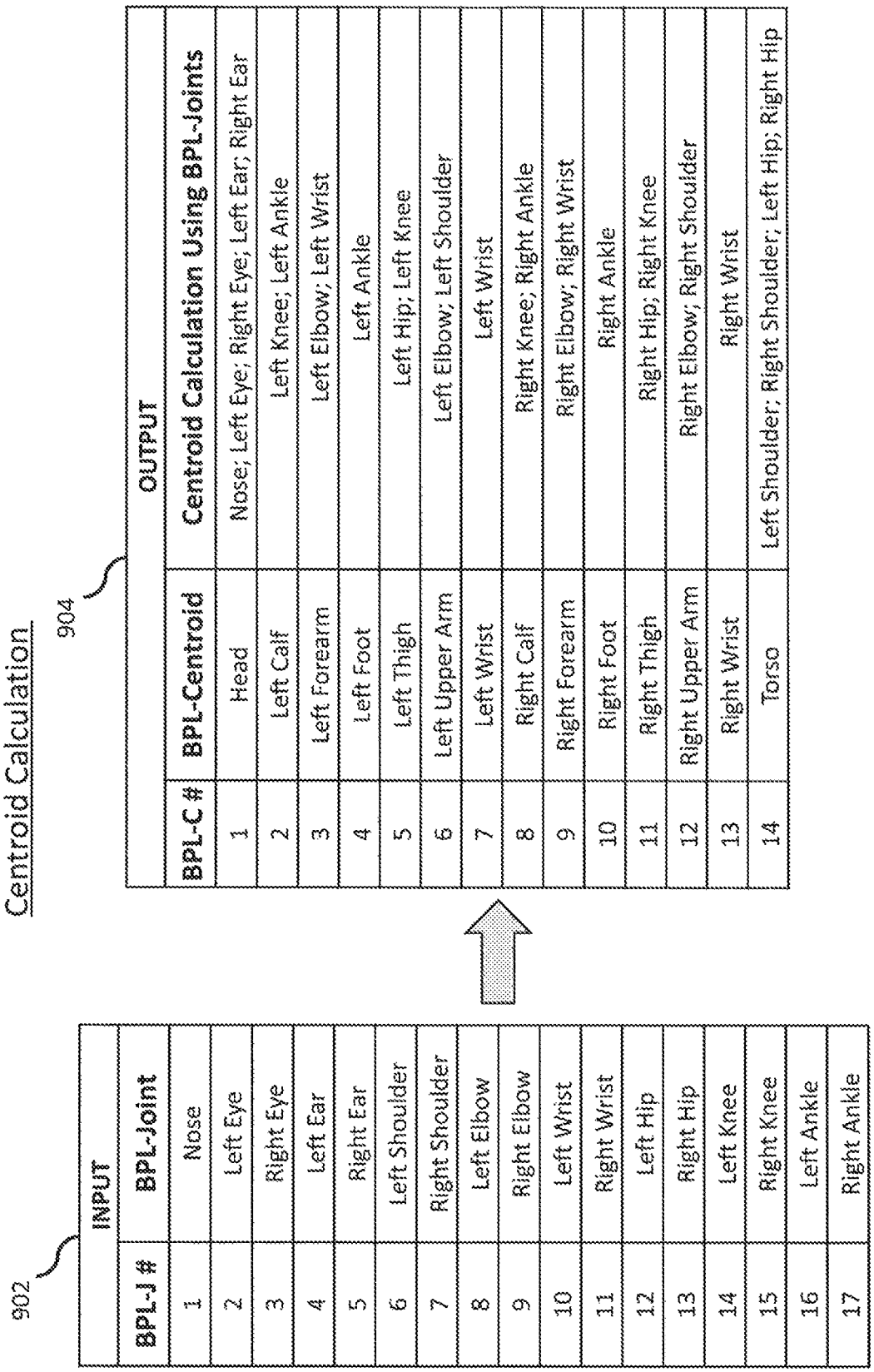
FIG. 9 is a diagram showing how the BPL Centroids are calculated from the BPL Joints, in accordance with embodiments of the present disclosure.

In some embodiments, the Centroid & Visibility/Occlusion Logic 208 uses the 17 BPL-Js, CL and ORTN (XYZ; CL; ORTN) for Player A and Player B for ICU1-ICU4 and calculates a 14 Body Part Label Centroids (BPL-Cs) for each main body part area, using the BPL Joints (BPL-J) 3D coordinate data and Confidence Level (XYZ; CL) for each BPL-J, as shown in FIG. 9, for BPL Joints (BPL-J) that have a Confidence Level (CL) of at least 90% (CL>=0.9), for each player, to provide 14 Body Part Label Centroids (14 BPL-C), having XYZ 3D spatial coordinates. If a BPL-J does not have at least 90% confidence for a given image frame for a given ICU, a BPL-C is not calculated for that image frame and ICU. Referring to FIG. 12, a sample table 1200 showing X,Y,Z coordinates of 14 BPL-Cs (or BPL Centroids) for Player A (PA) and Player B (PB), for image Frame 1, for ICU1, is shown. Also shown are truncated versions of Frames (2)-(N) for ICU1, and Frames (1)-(N) for ICU2 to ICUM.

In some embodiments, the Logic 208 also determines the value of a Visibility flag (V) for each BPL Centroid (BPL-C), which indicates whether a given BPL-C is blocked or occluded from viewing by a given ICU (e.g., blocked by another body part, another player, a referee/official, object, or the like), where V=1 means the BPL-C is Visible/Not-occluded; and V=0 means the BPL-C is Not-Visible/Occluded/blocked. The V value may be set by determining if a given BPL-C has the same pixel(s) as any other BPL-C for that player, and if so, determining if the BPL-C is occluded based on the orientation of the body of the players being reviewed. This is done for each BPL-C, for each Player, and for each ICU. The results of the Centroid & Visibility/Occlusion Logic 208, including the 14 BPL-Cs and the Visibility Flag (V) (XYZ; V) for Player A and Player B for each ICU may be stored in the Player Body Parts Data Server 216, or in another storage location.

Figure 3:
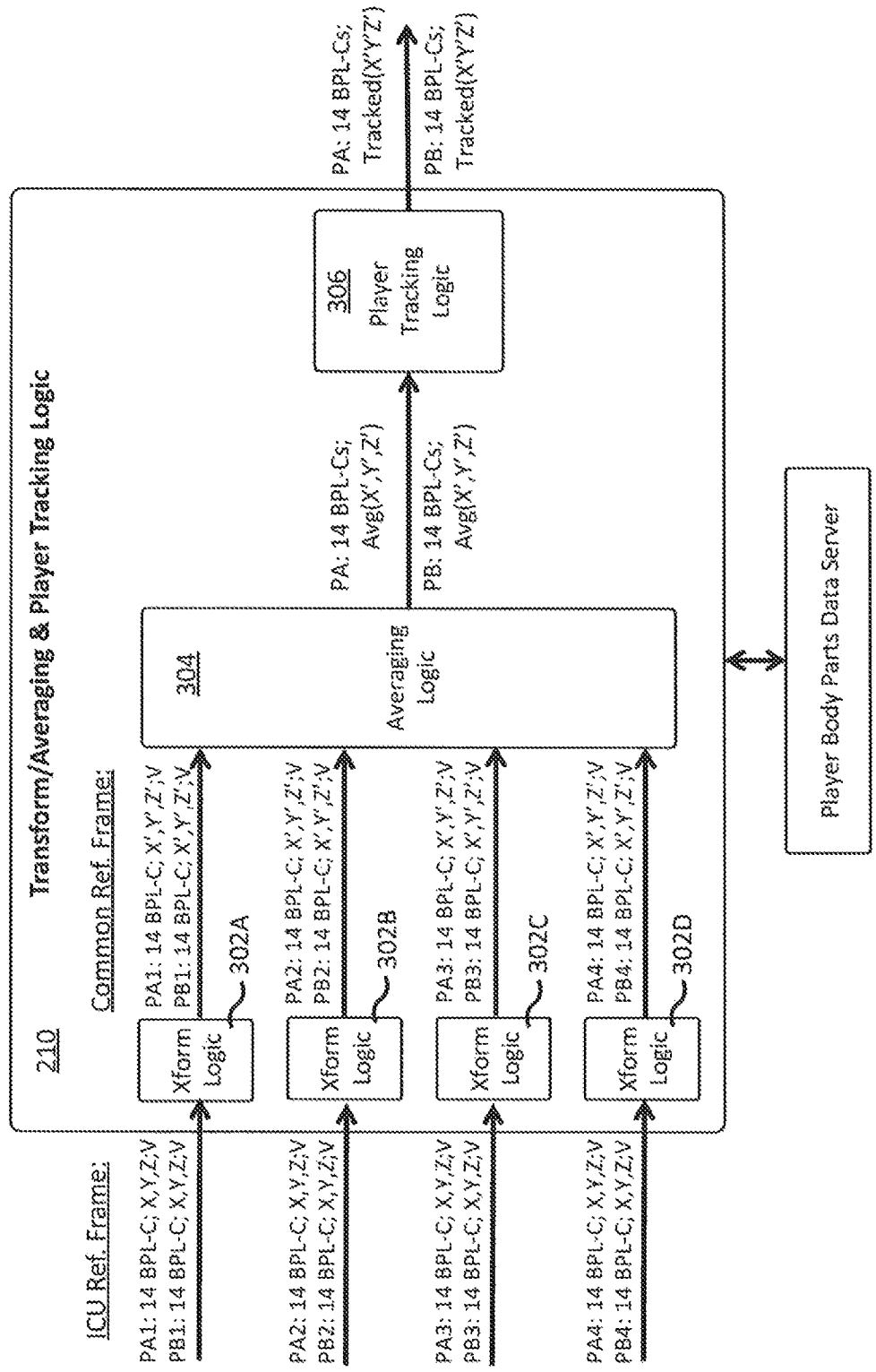
FIG. 3 is a top-level block diagram showing components of the system of FIG. 2, in accordance with embodiments of the present disclosure.

Referring to FIG. 2 and FIG. 3, in some embodiments, the Transform/Averaging & Player Tracking Logic 210 uses the 14 BPL-Cs and the Visibility Flag (V) (XYZ; V) for Player A and Player B for ICU1-ICU4 and performs three functions. First, the Logic 210 performs Transform Logic 302A-302D (FIG. 3) for each of the ICUs, respectively, which transforms the 14 BPL-Cs from their respective ICU1-ICU4 reference frames (X,Y,Z) to a common (or unified) reference frame (X',Y',Z'), for each player, for each ICU (discussed hereinafter).

Second, the Logic 210 performs Averaging Logic 304 (FIG. 3), which averages the values for each of the 3D X'Y'Z' coordinates for each of the BPL-Cs only where the visibility flag V=1 (or where BPL-Cs are visible), to provide a single set of values (X'Y'Z') for each BPL-C in the common reference frame for each player (PA: 14 BPL-Cs (X'avg, Y'avg, Z'avg); PB: 14 BPL-Cs (X'avg, Y'avg, Z'avg)), discussed hereinafter.

Third, the Logic 210 performs Player Tracking Logic 306 (FIG. 3), which receives the averaged values in the common reference frame for each player (PA: 14 BPL-Cs (X'avg, Y'avg, Z'avg); PB: 14 BPL-Cs (X'avg, Y'avg, Z'avg)), and tracks each BPL-C for each player to determine the current location of each BPL-C body part for each player. It does this by examining the location of each BPL-C in the immediately prior image frame, and assigning the current location of each BPL-C to Player A or Player B based on the nearest current BPL-C for each player. The result of the Player Tracking Logic 306 is an updated latest player-assigned/tracked single set of values (X'Y'Z') for each BPL-C in the common reference frame which has been tracked for each player from the prior image frame (tracked PA: 14 BPLs (X'avg, Y'avg, Z'avg); tracked PB: 14 BPLs (X'avg, Y'avg, Z'avg)).

The results of the Transform/Averaging & Player Tracking Logic 210 for Player A and Player B, including results from the Transform Logic 302A-302D, the Averaging Logic 304, and the Player Tracking Logic 306, may be stored in the Player Body Parts Data Server 216, or in another storage location.

Referring back to FIG. 2, the Metrics Calculation Logic 212 receives the tracked PA: 14 BPLs (X'avg, Y'avg, Z'avg) and tracked PB: 14 BPLs (X'avg, Y'avg, Z'avg), and calculates desired metrics regarding the athletes (or people) being tracked, based on the movement of their body part label centroids BPL-C. Examples of metrics for various BPL-C body parts for each player that may be calculated by the Metrics Calculation Logic 212, include the athlete's (or person's) location, velocity, pose, power, contact between objects/body parts, energy transferred upon contact, balance, positioning, "effective aggression", "ring generalship", or other performance metrics of the athlete. An example of a velocity calculation for each BPL-C for Player A and Player B is provided in FIG. 13 and discussed further herein with FIG. 11. The results of the Metrics Calculation Logic 212 for each of the BPL-Cs for Player A and Player B, may be stored in a Player Metrics Server 218, or in another storage location. Also, any additional data or constants needed to calculate the desired metrics of a given player, player physical attributes (height, weight, length of limbs, weight or mass of body parts, and the like), or image frame rate (DT, e.g., 1/60 sec), or any other additional needed data, may also be stored or retrieved from the Player Metrics Server 218, if desired.

Figure 7A:
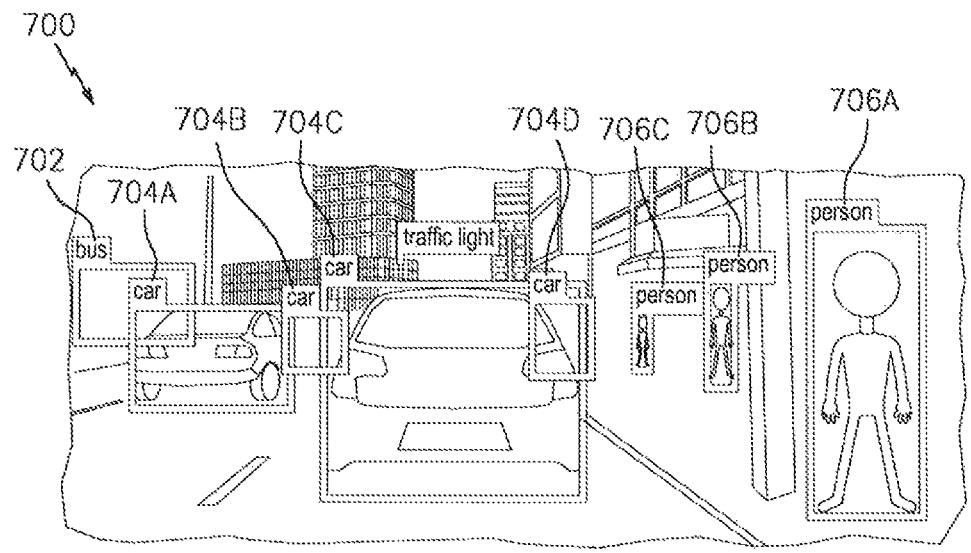
FIG. 7A is a diagram showing an image and pixel boxes indicating people and objects, in accordance with embodiments of the present disclosure.
Figure 7B:
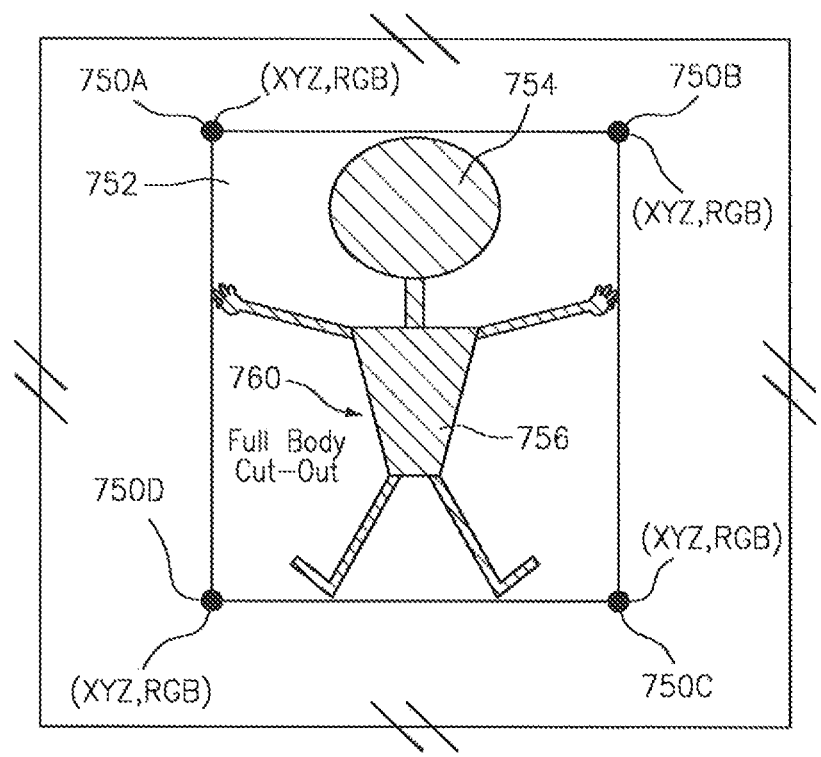
FIG. 7B is a diagram showing a single pixel box around a person in an image, in accordance with embodiments of the present disclosure.

Referring to FIGS. 4, 7A and 7B, a flow diagram 400 (FIG. 4) illustrates one embodiment of a process or logic for implementing the Player ID Logic 204 (FIG. 2). The process 400 begins at block 402 which retrieves an image frame having a format of XYZ,RGB for each pixel in the image frame from a given current ICU. Next, block 404 identifies people mask/areas (bounding boxes or people/person boxes or pixel boxes) in the image using the RGB data for each person in the image frame, using a known person/object detection (or identification) model (or instance segmentation model), such as YOLO/Mask-R-CNN (You Only Look Once/Mask-Regional-Convolutional Neural Network). Examples of YOLO and R-CNN and Mask-R-CNN are described in J. Redmon, et al., "You Only Look Once" Unified, Real-Time Object Detection", cs.CV 9 May 2016 (Project website: http://pjreddie.com/yolo/) and also at link: https://towardsdatascience.com/yolo-v3-object-detection-53fb7d3bfe6b, and also in M. Buric, et al., "Ball detection using Yolo and Mask-R-CNN", Conference Paper December 2018. Other person detection models may be used if desired, provide it provides the desired function and performance described herein.

YOLO/Mask-R-CNN provides, as is known, a plurality of boxes (or "bounding boxes") identified by pixel coordinates, such as that shown in FIG. 7A and FIG. 7B. In particular, FIG. 7A shows a city street image with people, cars and other objects, where the people in the image are identified as boxes 706A, 706B, 706C, 706D (largest to smallest). Other person/people identification models may be used provided they provide the desired function and performance described herein.

Also, FIG. 7B shows a sketch of a person pixel box 752, that may be obtained from the YOLO/Mask-R-CNN model, having four corners 750A, 750B, 750C, 750D defining the box which is fits tightly around the person image 760. The corners of the box retain the 3D spatial coordinates (XYZ) along with the 2D image data (RGB), and are kept track of during processing of the people boxes and BPLs so they can be placed back in the appropriate location in the pixel table image frame when needed for visibility/occlusion determination and other calculations, as discussed further herein. In addition to the pixel box area for the person, the model may also provide unlabeled masks/areas for regions of the body, such as the head 754, the torso 756, and other body part areas, or the entire body 760, i.e., full body cut-out (e.g., from Mask-R-CNN). These mask/areas 754,756,760 may be used herein when determining visibility/occlusion of body parts or when determining the body parts, discussed hereinafter.

Referring back to FIG. 4, after block 404 is performed, block 406 sorts the people pixel boxes by area size, and identifies the two largest boxes, and assigns an identity tag to Player A and Player B using player pixel descriptors described herein above. In particular, the block 406 will only choose the two largest people pixel boxes that are players based on the player pixel descriptors, thereby ignoring non-players in the image frame, such as a referee, official, spectator, coach or the like, even if they are one of the largest pixel boxes in the image (or closest to the ICU). For example, referring to FIG. 7, the person in pixel box 706A may be chosen as Player A and the person in the pixel box 706B may be chosen as Player B based on the player pixel descriptors. Next, block 408 saves the pixel people boxes for Players A and B for the current ICU on the Player Body Parts Data Server 216. Next block 410 determines if all ICUs have been checked and if not, block 412 goes to the next ICU and the logic proceeds back to block 402 to repeat the process described above. If the result of block 410 is Yes, all ICUs have been checked and the logic exits.

Referring to FIGS. 5 and 8A, a flow diagram 500 (FIG. 5) illustrates one embodiment of a process or logic for implementing the Pose Estimation Logic 206 (FIG. 2). The process 500 begins at block 502 which retrieves the pixel boxes for Player A (PA) and Player B (PB) from the Player ID Logic (or the Player Body Parts Data Server 216), the boxes having XYZ, RGB format for each pixel in the box for a given current ICU. Next, block 504 identifies 17 Body Part Labels (BPL-Joints or BPL-Js), including main body joints and five head points, in XYZ format, and a Confidence Level (CL), using a known pose estimation model, such as HRNet (High Resolution Neural Network), for Player A and Player B pixel boxes. An example of HRNet is described in the paper B. Cheng, et al., "HigherHRNet: Scale-Aware Representation Learning for Bottom-Up Human Pose Estimation", cs.CV 12 Mar. 2020 and also at: https://github.com/microsoft/human-pose-estimation.pytorch. Other pose estimation models may be used if desired, provided it provides the desired function and performance described herein.

The pose estimation model (HRNet, or the like) of block 504 uses the 2D RGB data for Player A and Player B from the Player ID Logic 204 (FIG. 2) and provides a pixel location (row-i, column-j) (or set of pixels) for a particular body part, which corresponds to the 3D (XYZ) location data for that body part using the same pixel coordinates (i,j), which may be stored in the pixel Table 900 of FIG. 8A. Thus, the pixel location coordinates (i,j) for the body parts from the pose estimation model may be used to obtain the 3D (XYZ) location data for the body parts.

An example of the 17 BPL-J's is shown in FIG. 8A, where each main joint is identified as 806A-817A for Player A and 806B-817B for Player B, and five head points are identified as 801A-805A for Player A and 801B-805B for Player B. Also, as the boxes may be operated on independently by the pose estimation model, separate from the larger image frame, the location of the boxes in the image frame (and all material labeled point in the boxes, e.g., BPL-Js) may need to be adjusted to ensure accurate analysis.

Also, FIG. 8A shows a Pixels/BPL Table/Image Frame 800 having rows(i) and columns(j), each cell (i,j) in the table 800 representing a pixel 860 (not drawn to scale) in the image frame, the data stored in that cell having a format of X,Y,Z; R,G,B, e.g., 480 rows by 640 columns. Other sizes for (i,j) total number of pixels in the image frame may be used if desired. The Table/Image frame 800 shows two people that do not overlap in the image (for illustrative purposes), e.g., Player A (on left) and Player B (on right), each having a box 856A, 856B, respectively, around them. In particular, the left person (Player A) box 806A, is defined by the box corner pixels (30,30; 30,100; 160,100; 160,30), and the right person (Player B) box 806B, is defined by the corner pixels (30,150; 30,220; 160,220; 160,150), clockwise around the boxes from upper left to lower left corners.

Referring back to FIG. 5, next, block 506 saves the 17 BPL-Js and CL (XYZ; CL) for PA and PB for the current ICU on the Player Body Parts Data Server 216. Next, block 508 determines if all the ICUs have been checked and if not, block 510 advances to the next ICU and the logic proceeds back to block 502 to repeat the process for the next ICU. If the result of block 504 is Yes, all ICUs have been checked and the logic exits.

Referring to FIGS. 6 and 8B and 9, a flow diagram 600 (FIG. 6) illustrates one embodiment of a process or logic for implementing the Centroid & Visibility/Occlusion Logic 208 (FIG. 2). The process 600 begins at block 602 which retrieves 17 BPL Joints (BPL-Js) from the Pose Estimation Logic or the Player Body Parts Data Server 216 having a data format including 3D coordinates (XYZ); Confidence Level (CL); and Orientation (ORTN), or (XYZ; CL; ORTN), for each Player for the current ICU. Next, block 604 calculates 14 Body Part Label Centroids (BPL-Cs) using the 17 BPL Joints (BPL-Js) with at least a 90% confidence level (CL>=0.9) for each Player. Any BPL-Js with a lower confidence level are not calculated for the current ICU for the current image frame, and the corresponding BPL-C=N/A (not available or not active or not valid), and will not be used in any visibility/occlusion determinations.

Referring to FIG. 9 and FIG. 8B, the inputs (Table 902—FIG. 9) and outputs (Table 904) of the centroid calculation are shown. In particular, for the Head centroid (BPL-C1), five head points BPL-J1 to BPL-J5 (Nose, Left Eye, Right Eye, Left Ear, Right Ear) are used to calculate a centroid point (or set of points or pixels) to represent the Head centroid (BPL-C1), e.g., the point or pixel closest to the center of these five (5) head points in XYZ 3D space, as shown in the output table 904. Similarly, for the Torso area (BPL-C14), four (4) body joint points (Left Shoulder, Right Shoulder, Left Hip, Right Hip) are used to calculate a centroid point (or set of points or pixels) to represent the Torso centroid (BPL-C14), e.g., the point or pixel closest to the center of these four points in XYZ 3D space, as shown in the output table 904. For certain centroids, the centroid may be calculated as the center (or middle or average location) between two joints, such as Left Calf centroid (BPL-C2), would be the center distance between the Left Knee and Left Ankle in XYZ space, as shown in output table 904. For certain other centroids, the joint and the centroid may be the same region of the body as the joint, such as for Left Foot (use Left Ankle joint), Left Wrist (use Left Wrist joint), Right Ankle (use Right Ankle joint), Right Wrist (use Right Wrist joint).

Referring to FIG. 8B, a pixel matrix/table showing people pixel boxes and Body Part Label Centroids (BPL-Cs) is shown for example Player A (in pixel box 856A) and Player B (in pixel box 856B), where BPL-C1 to BPL-C14 (FIG. 9) for Player A corresponds to numerals 901A to 914A, respectively, and where BPL-C1 to BPL-C14 (FIG. 9) for Player B corresponds to numerals 901B to 914B, respectively.

Referring to FIG. 12, a table 1200 shows sample values for XYZ coordinates for the 14 BPL-Cs for Player A (PA) and Player B (PB) for Image Frame 1, and Frames (2) to (N), for ICU1. It also shows a sample structure for ICU2 to ICUM, for M ICUs. Any number of ICUs may be used and positioned around the perimeter of the ring or sports arena, to get multiple views of the players on the field or in the ring, if desired. The more ICUs, the better likelihood that most BPL-C views will not be occluded.

Referring back to FIG. 6, after block 604 calculates the centroids, block 606 retrieves Body Mask/Areas from the Server 216 for one Player (e.g., head area, torso area), such as the masks/areas (or sets of pixels) 756 (body) and 754 (head) shown in FIG. 7B. Next, block 608 selects the first BPL-C on the current Player to check for occlusion (e.g., BPL-C1). Next, block 610 determines whether the current BPL-C has any of the same pixels (overlapping pixels) as any other BPL-C or any 17 BPL-J or any Body Mask/Areas for the current Player. If Yes, then occlusion exists and block 612 determines if the current BPL-C is occluded (or blocked) by the other (overlapping) body part based on the orientation (ORTN) of the current Player's body. If the result of block 612 is Yes, the current BPL-C is occluded from being seen by the current ICU and block 614 sets the visibility flag to zero V=0 (no visibility) for the current BPL-C and the current ICU. If the result of the blocks 610 or 612 is NO, block 616 sets the visibility flag to one V=1 (yes visible) for the current BPL-C and current ICU. Next, or after block 614 is performed, a block 618 determines if all the available BPL-Cs for the current Player have been checked. If not, block 620 goes to the next BPL-C and the logic proceeds back to block 610 to check the next BPL-C for the current Player. If the result of block 618 is YES, all BPL-Cs have been checked for the current Player and block 622 determines if all the Players have been checked. If not, block 624 goes to the next Player and the logic proceeds back to block 606 to check occlusion for the next Player. If the result of block 622 is YES, all Players have been checked and block 626 updates the visibility flag (V) values for all BPL-Cs for all Players for current ICU on the Server 216. Next, block 628 determines if all the ICUs have been checked. If NO, block 630 goes to the next ICU and the logic proceeds back to block 602 to repeat the process described above for the next ICU. If the result of block 630 is YES, all ICUs have been completed and the logic exits.

Referring to FIG. 10, a flow diagram 1000 (FIG. 10) illustrates one embodiment of a process or logic for implementing the Transform/Averaging & Player Tracking Logic 210 (FIG. 2). The process 1000 begins at block 1002 which retrieves 14 BPL-Cs (X,Y,Z; V) for Player A and Player B from the Server 216. Next, block 1004 performs Transform (Xform) Logic 302A-302D (FIG. 3) by transforming the 14 BPL-Cs (X,Y,Z) (or the collection of points or pixels associated with the body part) from the ICU (or local) reference frame to a single common (or unified) reference frame 14 BPL-Cs (X',Y',Z') for Player A and Player B for each ICU. More details on how to perform the transform are discussed below. Next, block 1006 performs Averaging Logic 304 (FIG. 3) by calculating average values for the 14 BPL-Cs (X',Y',Z') for a given image frame, only including values when V=1 (visibility flag). More details on how to perform the average calculation are discussed below. Next, block 1008 performs Player Tracking Logic 306 (FIG. 3) by tracking each BPL-C for each player to determine the current location of each BPL-C body part for each player. It does this by examining the location of each BPL-C in the immediately prior image frame, and assigning the current location of each BPL-C to Player A or Player B based on the nearest current BPL-C for each player. Thus, block 1008 assigns BPL-C to Player A and Player B based on the BPL-C location in prior image from and nearest current BPL-C for each Player, thereby tracking (and assigning) the BPL-C's to the appropriate player from frame to frame. The player tracking of block 1008 provides accurate tracking as the image frame rate (e.g., 1/60 sec.) is much faster than a person can move.

Regarding the transform for the 14 BPL-Cs (X,Y,Z) from the image capture unit ICU (or local) reference frame to a common (or unified) reference frame 14 BPL-Cs (X',Y',Z'), each ICU captures 3D data in the form of a collection of points (e.g., a "point cloud") where each point is the 3D coordinate of a location within the scene being viewed. The coordinate data is typically in the form of x, y, z coordinates within a Euclidean space. The coordinate reference frames in which these points are defined are fixed relative to the associated image capture unit (ICU). Each ICU has its own distinct coordinate reference frame associate with that ICU.

The coordinate data for the points generated by each ICU is defined relative to the ICUs frame of reference. The coordinate values of points defined for one ICU are not directly defined with respect to any of the coordinate reference frames of the other ICUs. The coordinate data of the multiple ICUs are related to one another through transformations. Accordingly, a single common (or unified) frame of reference is defined. The coordinate values from each ICU are converted to a representation defined in terms of the common frame of reference. The conversions to the common frame of reference are defined by transformations on the values.

Each ICU directly acquires 3D XYZ coordinate data defined with respect to the ICUs frame of reference. For each ICU, the transformation of coordinate data to the common frame of reference is achieved through a known "translation" transformation and a "rotation" transformation associated with that ICU. Both the translation and rotation transformations are defined in three dimensions XYZ. These transformations represent the position and orientation of the individual ICU frame of reference with respect to the common frame of reference. Once the BPL-C points are defined in terms of a unified common frame of reference, the XYZ coordinate data from every ICU are now directly related to one another and can be analyzed and averaged together to use the information from all the ICUs synergistically and collectively in the aggregate.

To compute the transform for the 14 BPL-Cs (X,Y,Z) (or the collection of points or pixels associated with the body part) from the image capture unit ICU (or local) reference frame to a common (or unified) reference frame 14 BPL-Cs (X',Y',Z'), the following transform technique may be used. In general, the rotation and translation transforms are well known in the art, such as is discussed in: Richard Hartley and Andrew Zisserman (2003), Multiple View Geometry in computer vision, Cambridge University Press, Sect. 6.1, p 155, "Camera rotation and translation", and also https://en.wikipedia.org/wiki/Camera_matrix.

In particular, using homogeneous coordinates, the two operations of rotation and translation of 3D coordinates can be represented as the two 4×4 matrices:

$$\left(\begin{array}{c|c} R & 0 \\ \hline 0 & 1 \end{array}\right) \text{ and } \left(\begin{array}{c|c} I & t \\ \hline 0 & 1 \end{array}\right)$$

where R is a 3×3 rotation matrix and t is a 3-dimensional translation vector, as described in the above transform references.

The present disclosure uses only the rotation and translation components of the camera transforms. The "perspective" transformation described in the above transform references is not relevant when the ICU produces 3D XYZ data directly, as in the present disclosure. These transforms take coordinates in the ICU's frame of reference and multiply each coordinate by the rotation and translation matrices.

The rotation and translation transforms can be combined into a single matrix:

$$\left(\begin{array}{c|c} R & t \\ \hline 0 & 1 \end{array}\right)$$

which is used to transform points in the ICUs frame of reference to the common frame of reference:

$$X' = \left(\begin{array}{c|c} R & t \\ \hline 0 & 1 \end{array}\right) X$$

where X is a point represented in the ICU's frame of reference and X' is the point represented in the single common frame of reference.

To compute the average of the common reference frame coordinates X'Y'Z' (or Avg X'Y'Z') from four ICUs for a given Body Part Label Centroid (BPL-C), such as the Left Wrist, for a given image frame, the Logic 1000 retrieves the X'Y'Z' (in the common reference frame) and the visibility flag V for the Left Wrist, for each ICU, as shown below:

ICU1 Left Wrist: (X1',Y1',Z1';V1)
ICU2 Left Wrist: (X2',Y2',Z2';V2)
ICU3 Left Wrist: (X3',Y3',Z3';V3)
ICU4 Left Wrist: (X4',Y4',Z4';V4)

To calculate the Average X'Y'Z', if all visibility flags (V1 to V4)=1, then all four ICUs have visibility to the Left Wrist and all four ICUs XYZ data values are used and the Average X'Y'Z' for Left Wrist would be calculated as:

$X'\text{avg}=(X1'+X2'+X3'+X4')/4$ $Y'\text{avg}=(Y1'+Y2'+Y3'+Y4')/4$ $Z'\text{avg}=(Z1'+Z2'+Z3'+Z4')/4$ If V1=0, and V2 to V4=1, then ICU1 XYZ data values would be removed from the averaging calculation and the Average X'Y'Z' for Left Wrist would be calculated as:

$X'\text{avg}=(X2'+X3'+X4')/3$ $Y'\text{avg}=(Y2'+Y3'+Y4')/3$ $Z'\text{avg}=(Z2'+Z3'+Z4')/3$ Similarly, if V1=0 and V3=0, and V2=1 and V4=1, then ICU1 and ICU3 XYZ data would be removed from the averaging calculation and the Average X'Y'Z' for Left Wrist would be calculated as:

$X'\text{avg}=(X2'+X4')/2$ $Y'\text{avg}=(Y2'+Y4')/2$ $Z'\text{avg}=(Z2'+Z4')/2$ Similarly, if V1=V2=V3=0 and V4=1, then only ICU4 has visibility to the Left Wrist and only ICU4 XYZ data values are used and the other three ICUs would be removed from the averaging calculation and the Average X'Y'Z' for Left Wrist would be calculated as shown below (i.e., no averaging occurs):

$X'\text{avg}=(X4')/1=X4'$ $Y'\text{avg}=(Y4')/1=Y4'$ $Z'\text{avg}=(Z4')/1=Z4'$ Referring to FIG. 11, a flow diagram 1100 (FIG. 11) illustrates one embodiment of a process or logic for implementing the Metrics Calculation Logic 212 (FIG. 2). The process 1100 begins at block 1102 which retrieves 14 BPL-Cs Avg (X',Y',Z'; V) the Server 216. Next, block 1104 retrieves fixed parameters needed for BPL-C metrics calculations (e.g., DT (1/60 sec); player weight, arm length, leg length, and the like). Next block 1106 performs metrics calculations for current BPL-C. See below example of a velocity metrics calculation.

Next, block 1108 determines if all image frames have been done for the current BPL-C. If NO, block 1110 goes to the next image frame and the logic proceeds back to block 1102 to get the BPL-C. If the result of block 1108 is Yes, block 1112 determines if all BPL-Cs have been done. If No, block 1114 goes to the next BPL-C and the logic proceeds back to block 1102 to get the BPL-C. If the result of block 1116 is Yes, block 1116 determines if all Players have been done. If No, block 1118 goes to the next Player and the logic proceeds back to block 1102 to get the BPL-C for next Player. If the result of block 1116 is Yes, block 1120 determines if all Metrics have been calculated. If No, block 1122 goes to the next Metric and the logic proceeds back to block 1102 to get the BPL-C. If the result of block 1124 is Yes, all the Metrics have been calculated and block 1124 saves all Metrics for all BPL-Cs for all Players on the Player Metrics Server 218 (FIG. 2).

Referring to FIG. 13, a Velocity Calculation Table shows sample format and variables for a Metrics calculation of Velocity for the 14 BPL-Cs for Player A (PA) and Player B (PB) for Image Frame (1) to (N). It also shows X'avg(n), Y'avg(n), Z'avg(n); distance traveled; and output velocity at each Frame(n).

The velocity of a BPL-C, e.g., the Left Wrist (BPL-C7), of a given player at a time represented by a given frame, may be calculated using the following equation:

$$\text{Velocity}=\text{Distance\_Traversed}/\text{Time\_Elapsed}$$

where Time_Elapsed is the time between image frames or DT=1/60 sec., and Distance_Traversed is the distance traveled by the body part, or Dist (n−1 to n), using the location of the body part in the current frame Frame(n) minus the location of the body part in the prior frame Frame(n−1) in 3D space (using square root of the-sum of the-squares), as shown below:

SquareRoot[$(X'avg(n)-X'avg(n-1))^2+(Y'avg(n)-Y'avg(n-1))^2+(Y'avg(n)-Y'avg(n-1))^2$]

Many different performance metrics may be calculated by the Metrics Calculation Logic 1100, such as location, velocity, pose, power, contact between objects/body parts, energy transferred upon contact, balance, positioning, "effective aggression" (e.g., consistently landing punches and avoiding punches from opponent), "ring generalship" (or ring control or control of the ring during a bout by, e.g., initiating exchanges and causing opponent to adjust), or other performance metrics. Such metrics are determined using the locations of the body parts (e.g., BPL-Cs) of the players and certain constants (as needed), such as image capture rate, weight/mass, arm length, and the like, and known relationships or equations (as needed) for calculating such parameters or metrics.

Figure 2A:
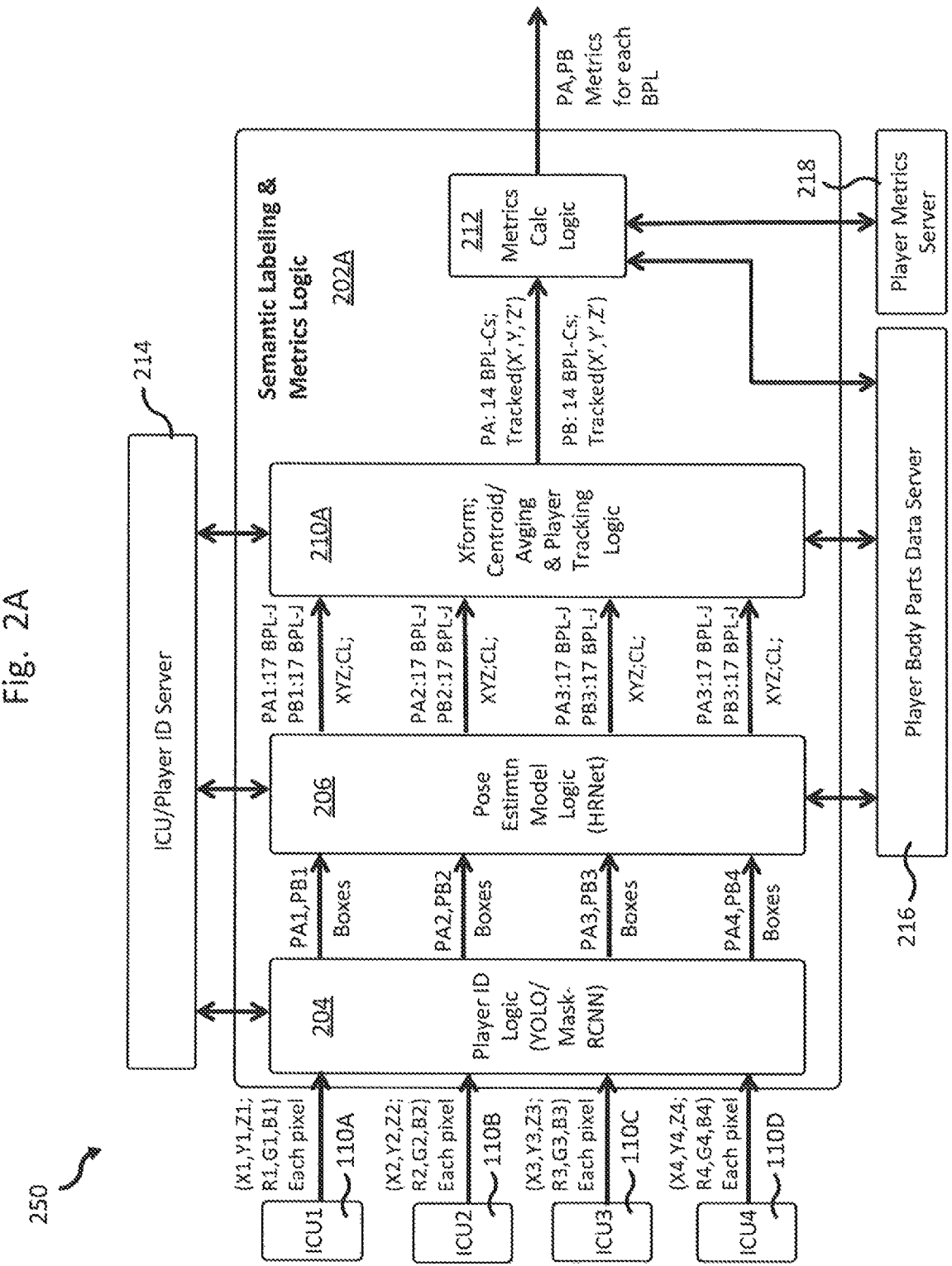
FIG. 2A is a top-level block diagram showing components of an alternative embedment of a system for providing multi-camera 3D body part labeling and performance metrics, in accordance with embodiments of the present disclosure.
Figure 3A:
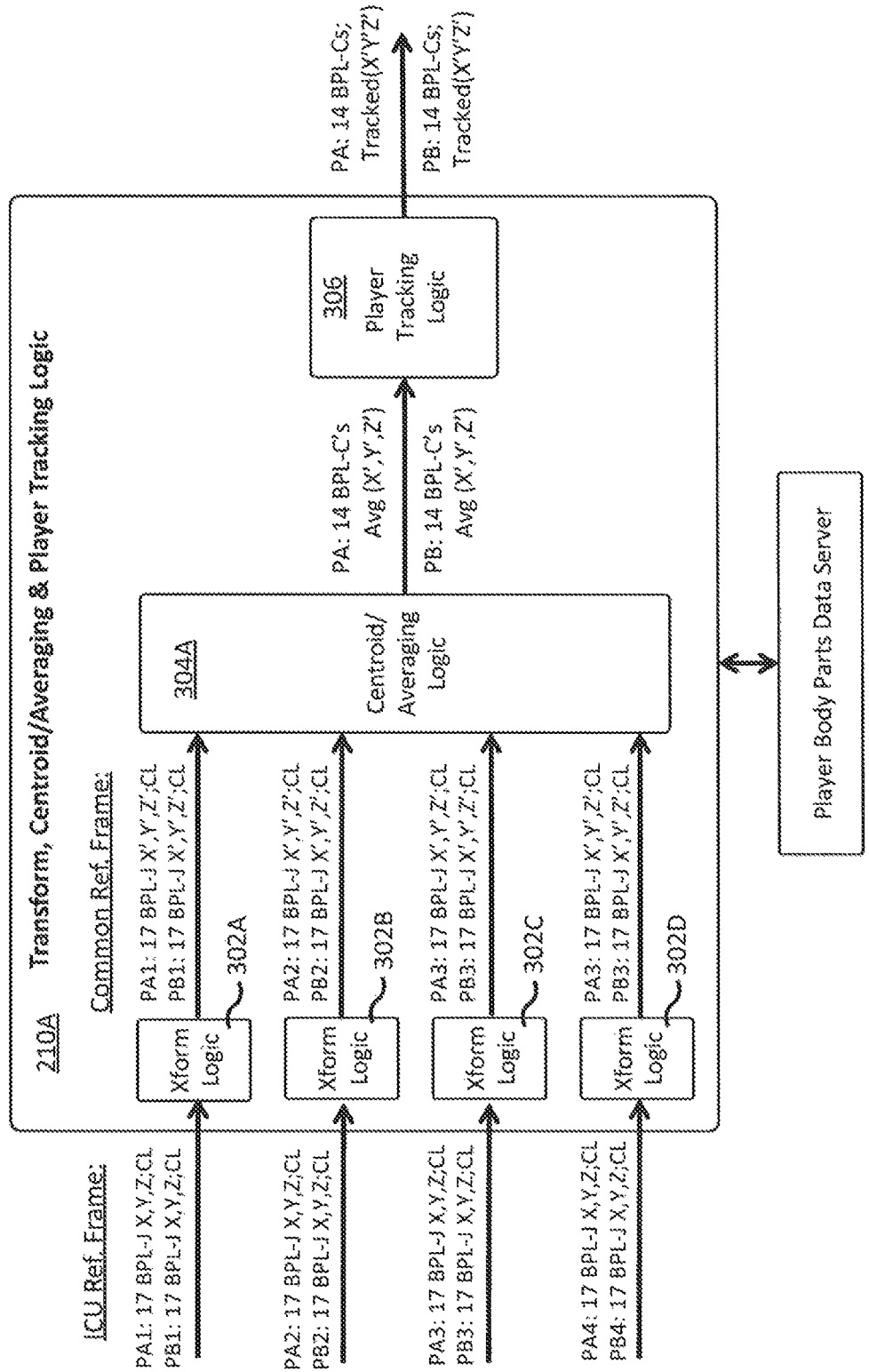
FIG. 3A is a top-level block diagram showing components of the system of FIG. 2A, in accordance with embodiments of the present disclosure.
Figure 10A:
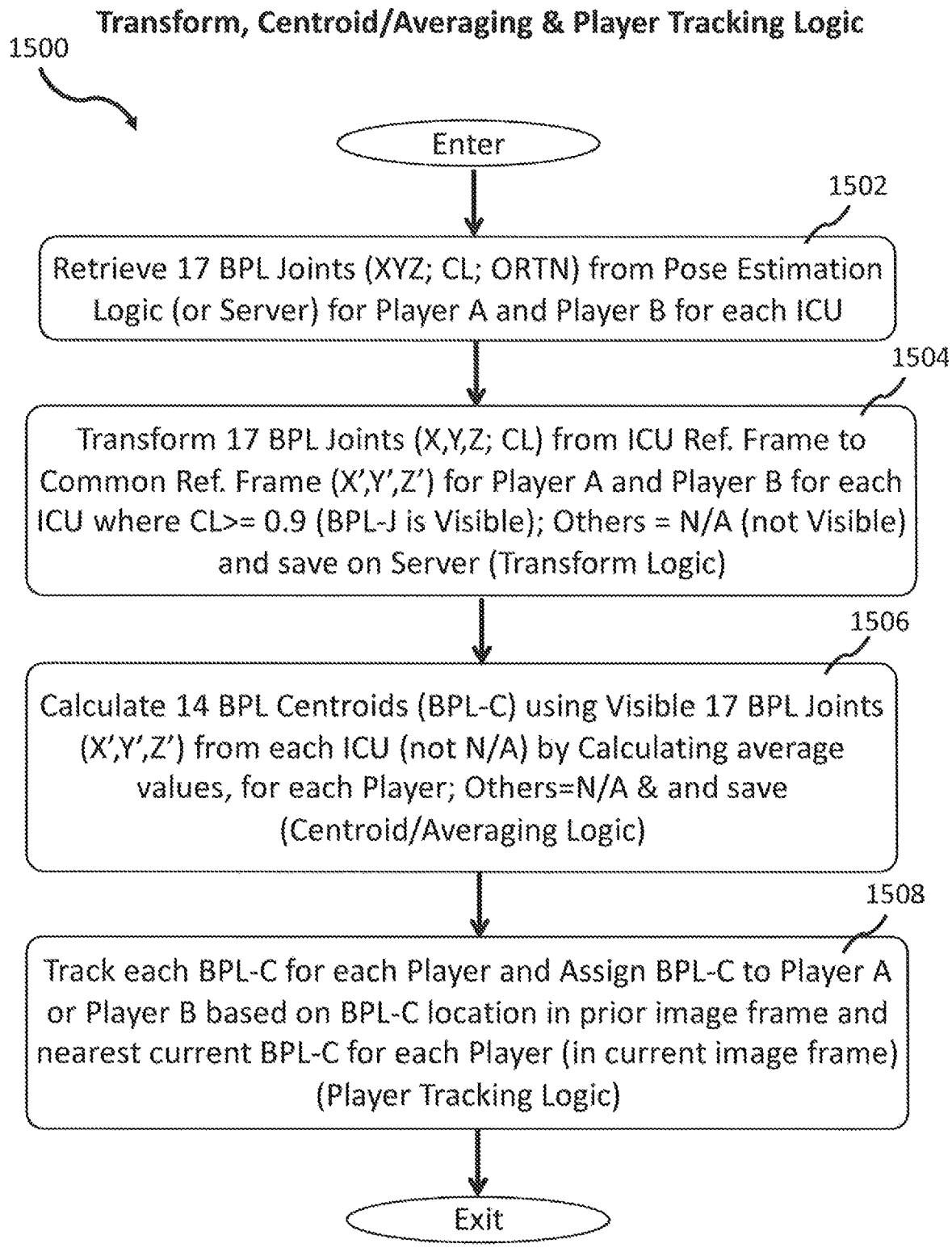
FIG. 10A is a flow diagram of Transform, Centroid/Averaging & Player Tracking Logic, in accordance with embodiments of the present disclosure

Referring to FIG. 2A, FIG. 3A, and FIG. 10A, an alternative embodiment 250 of the system and method of the present disclosure is shown. In this embodiment, the present disclosure combines data from multiple ICUs (or views) after the Pose Estimation Model Logic 206 then performs analysis on the combined, transformed (common reference frame) data. In particular, a block 210A (FIG. 2A and FIG. 3A) replaces blocks 208 and 210 in FIG. 2 and performs the Transform (Xform) Logic 302A-302D (FIG. 3A) on the 17 BPL-J's (or the collection of points or pixels associated with the body part), from the ICU reference frame to the common reference frame, as well as a Centroid/Averaging calculation 304A, and then the Player Tracking Logic 306 (collectively shown in the flow diagram of FIG. 10A, discussed below). By performing the Transform Logic 302A-302D on the 17 BPL-Js (instead of on the 14 BPL-C, as in the other embodiment), it allows the Centroid/Averaging Logic to consolidate several processing steps and also determine visibility of body parts without having a separate visibility/occlusion logic, as shown in the diagram of FIG. 3A.

Referring to FIG. 10A, a flow diagram 1500 illustrates one embodiment of a process or logic for implementing the Transform; Centroid/Averaging & Player Tracking Logic 210A (FIG. 2A and FIG. 3A). The process 1500 begins at block 1502 which retrieves 17 BPL Joints (BPL-Js) from the Pose Estimation Logic or the Player Body Parts Data Server 216 having a data format including 3D coordinates (XYZ); Confidence Level (CL); (XYZ; CL), for each Player for the current ICU. While orientation (ORTN) is provided by the Pose Estimation Logic, it is not used in this logic for this embodiment. Also, the Confidence Level (CL) may also be referred to herein as a visibility confidence level, as it is an indication of how visible the body part is for a given ICU.

Next, block 1504 performs the Transform (Xform) Logic 302A-302D (FIG. 3A) by transforming the 17 BPL-Js (X,Y,Z) from the ICU (or local) reference frame to a single common (or unified) reference frame 17 BPL-Js (X',Y',Z') for Player A and Player B for each ICU only for BPL-J values when the Confidence Level (CL) is at least 90% (i.e., CL>=0.9, or is considered "Visible" by a given ICU). Thus, in this embodiment, the CL value for each joint (BPL-J) is used to determine the visibility of a given joint, and only the visible joints are transformed to the common reference frame (X'Y'Z'), and the non-visible BPL-Js are set to N/A (or not visible). More details on how the transform is performed are discussed herein above with FIG. 10.

Next, block 1506. calculates 14 Body Part Label Centroids (BPL-Cs) using the visible 17 BPL Joints (BPL-Js) where the transform was performed (i.e., with at least a 90% confidence level (CL>=0.9)) for each ICU and each Player, by calculating average values for the 17 BPL-Js (X',Y',Z') for a given image frame, only including BPL-J's with values (i.e., BPL-J is visible), which may be referred to as. Centroid/Averaging Logic 304A (FIG. 3A). More details on how the centroid/averaging calculation is performed are discussed below. Any BPL-Js with a low confidence level (CL<0.9) are not used for the current ICU for the current image frame, and the corresponding BPL-C=N/A (not available or not active or not valid).

As discussed herein, by doing the transform earlier in the process, it consolidates and simplifies the Centroid calculation and the visibility/occlusion logic and uses the Confidence Level (LC) to also determine visibility. To compute the Body Part Label Centroid (BPL-C) for a given body part, such as the Left Forearm, the logic averages the common reference frame coordinates X'Y'Z' (or Avg X'Y'Z') from all the ICUs that have valid values for the visible adjacent joints (BPL-J's), i.e., Left Wrist and Left Elbow, for a given image frame.

As discussed herein, by doing the transform earlier in the process, it consolidates and simplifies the Centroid calculation and the visibility/occlusion logic and uses the Confidence Level (LC) to also determine visibility. To compute the Body Part Label Centroid (BPL-C) for a given body part, such as the Left Forearm, the logic averages the common reference frame coordinates X'Y'Z' (or Avg X'Y'Z') from all the ICUs that have valid values for the visible adjacent joints (BPL-J's), i.e., Left Wrist and Left Elbow, for a given image frame.

In particular, the Logic 1500 retrieves the BPL-J's (X'Y'Z') (in the common reference frame) for the Left Wrist (LW) and Left Elbow (LE), for each ICU, as shown below:
ICU1 Left Wrist: (X1',Y1',Z1') or (X1'LW,Y1'LW,Z1'LW)
ICU2 Left Wrist: (X2',Y2',Z2') or (X2'LW,Y2'LW,Z2'LW)
ICU3 Left Wrist: (X3',Y3',Z3') or (X3'LW,Y3'LW,Z3'LW)
ICU4 Left Wrist: (X4',Y4',Z4') or (X4'LW,Y4'LW,Z4'LW)
ICU1 Left Elbow: (X1',Y1',Z1') or (X1'LE,Y1'LE,Z1'LE)
ICU2 Left Elbow: (X2',Y2',Z2') or (X2'LE,Y2'LE,Z2'LE)
ICU3 Left Elbow: (X3',Y3',Z3') or (X3'LE,Y3'LE,Z3'LE)
ICU4 Left Elbow: (X4',Y4',Z4') or (X4'LE,Y4'LE,Z4'LE)

For the case where all four ICUs have provided data form the Left Wrist and the Left Elbow, to calculate the Centroid BPL-C for the Left Forearm, the logic averages the X',Y',Z' data values for all four ICUs for the Left Wrist and the Left Elbow. Thus, the Centroid BPL-C (X'Y'Z') for the Left Forearm would be calculated as shown below:

$X'=[(X1'LW+X2'LW+X3'LW+X4'LW)+(X1'LE+X2'LE+X3'LE+X4'LE)]/8$ $Y'=[(Y1'LW+Y2'LW+Y3'LW+Y4'LW)+(Y1'LE+Y2'LE+Y3'LE+Y4'LE)]/8$ $Z'=[(Z1'LW+Z2'LW+Z3'LW+Z4'LW)+(Z1'LE+Z2'LE+Z3'LE+Z4'LE)]/8$

If one of the ICUs (e.g., ICU1) did not provide a transformed BPL-J value (X'Y'Z'), e.g., BPL-J=N/A (or not visible) for the Left Wrist because confidence level was less than 90%; CL<0.9, then ICU1 X1',Y1',Z1' data values would be removed from the centroid averaging calculation and the Centroid BPL-C (X'Y'Z') for Left Forearm X'Y'Z' would be calculated without that parameter in the numerator and the denominator would be 7 instead of 8. A corresponding change in the calculation would occur if more than one ICU for a given Centroid BPL-C calculation.

If one of the ICUs (e.g., ICU1) did not provide a transformed BPL-J value (X'Y'Z'), e.g., BPL-J=N/A (or not visible) for the Left Wrist because confidence level was less than 90%; CL<0.9, then ICU1 X1',Y1',Z1' data values would be removed from the centroid averaging calculation and the Centroid BPL-C (X'Y'Z') for Left Forearm X'Y'Z' would be calculated without that parameter in the numerator and the denominator would be 7 instead of 8. A corresponding change in the calculation would occur if more than one ICU for a given Centroid BPL-C calculation.

Referring back to FIG. 10A, after the Centroid/Average is calculated in block 1506, block 1508 performs the Player Tracking Logic 306 (FIG. 3) by tracking each BPL-C for each player to determine the current location of each BPL-C body part for each Player, which is the same as that described herein above with FIG. 10, and the logic exits. The player tracking of block 1008 provides accurate tracking as the image frame rate (e.g., 1/60 sec.) is much faster than a person can move, as discussed herein. The output of the Transform, Centroid/Averaging & Player Tracking Logic is provided to the Metrics Calculation Logic 212 with the same parameters as with the other embodiment discussed herein.

Figure 14A:
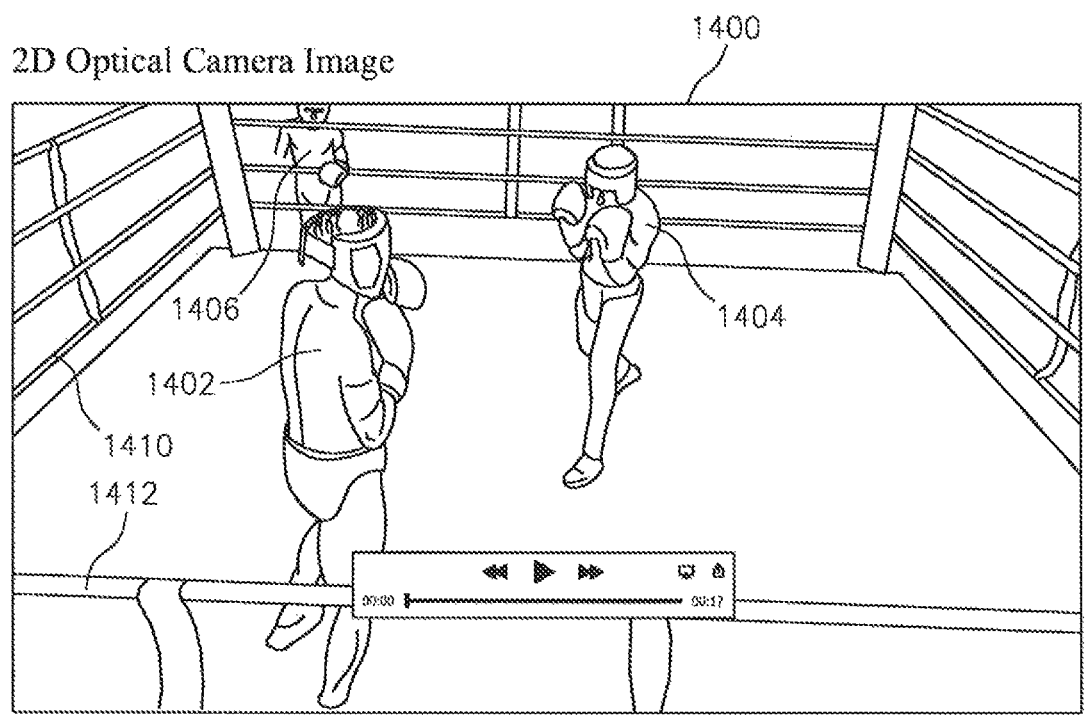
FIG. 14A shows a 2D optical camera view from an Image Capture Unit (ICU), in accordance with embodiments of the present disclosure.
Figure 14B:
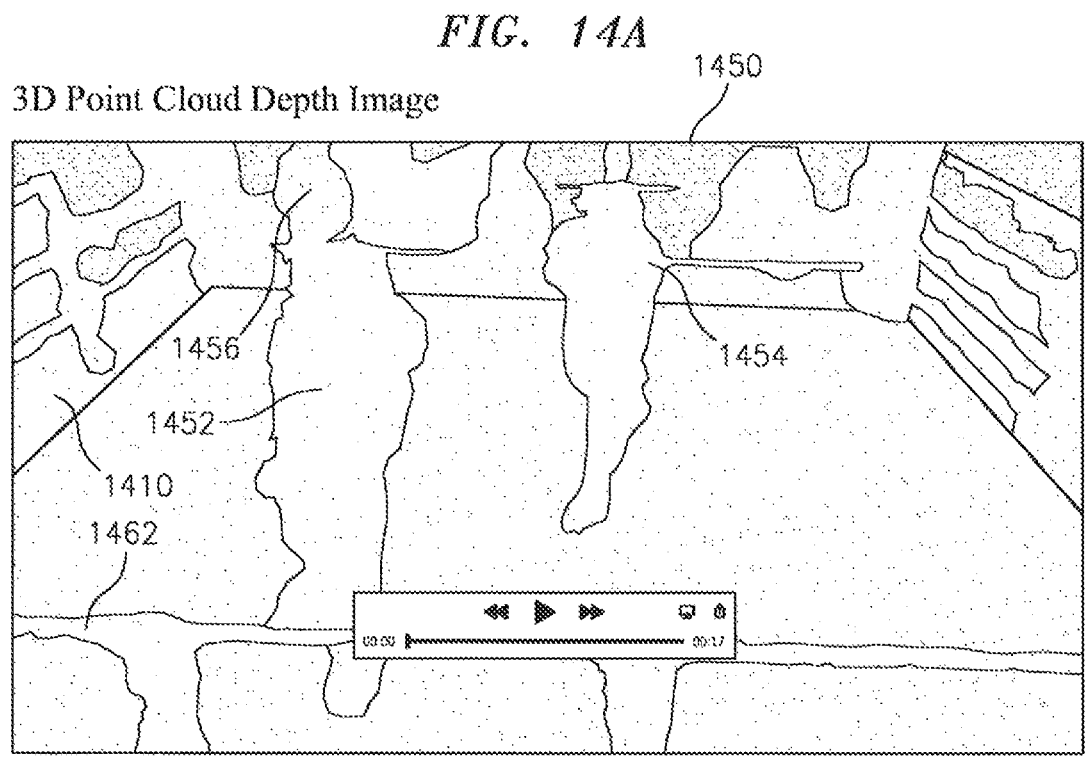
FIG. 14B shows a 3D point cloud depth data from the Image Capture Unit (ICU) of FIG. 14A, in accordance with embodiments of the present disclosure.

Referring to FIGS. 14A and 14B, as discussed herein, the Image Capture Units (ICUs) provide two outputs, a 2D camera image (in RGB data format) and a 3D depth cloud data (in XYZ coordinates format). In particular, FIG. 14A shows a 2D optical camera view image 1400 from an Image Capture Unit (ICU) (not shown) located on a side of a square boxing ring 1410. The image 1400 shows two boxers 1402,1404 in the boxing ring closest to the ICU. The image 1400 also shows people 1406 outside the ring on the far side of the boxing ring.

Referring to FIG. 14B, a 3D point cloud depth image 1450, indicative of 3D depth data (or depth cloud data) from the Image Capture Unit (ICU) of FIG. 14A is shown. The image 1450 shows outlined regions 1452,1454, indicative of depth data of the two boxers 1402,1404, respectively, of FIG. 14A. The lighter the image or pixels appear in the image 1450, the closer the object/person is to the ICU, and the darker the image or pixels appear in the image 1450, the farther the object/person is from the ICU. Thus, the region 1452 corresponding to the boxer on the left (e.g., Player A) 1402 is shown as lighter than the region 1454 corresponding to the boxer on the right (e.g., Player B) 1404, as Player A is closer to the ICU than Player B. The image 1450 also shows an outlined region 1406, indicative of depth data of the person 1456 outside of the boxing ring on the far side and being further away from the ICU than the two boxers in FIG. 14A. Similarly, the image 1450 shows a region 1462 indicative of depth data for an upper rope 1412 (FIG. 14A) of the boxing ring 1410 closest to the ICU, which appears lighter than the region 1452 as it is closer to the ICU. As discussed herein, the actual digital data from each of the ICUs would be 3D (XYZ) coordinates data and 2D (RGB) image data, for each pixel in the image frame.

Figure 15A:
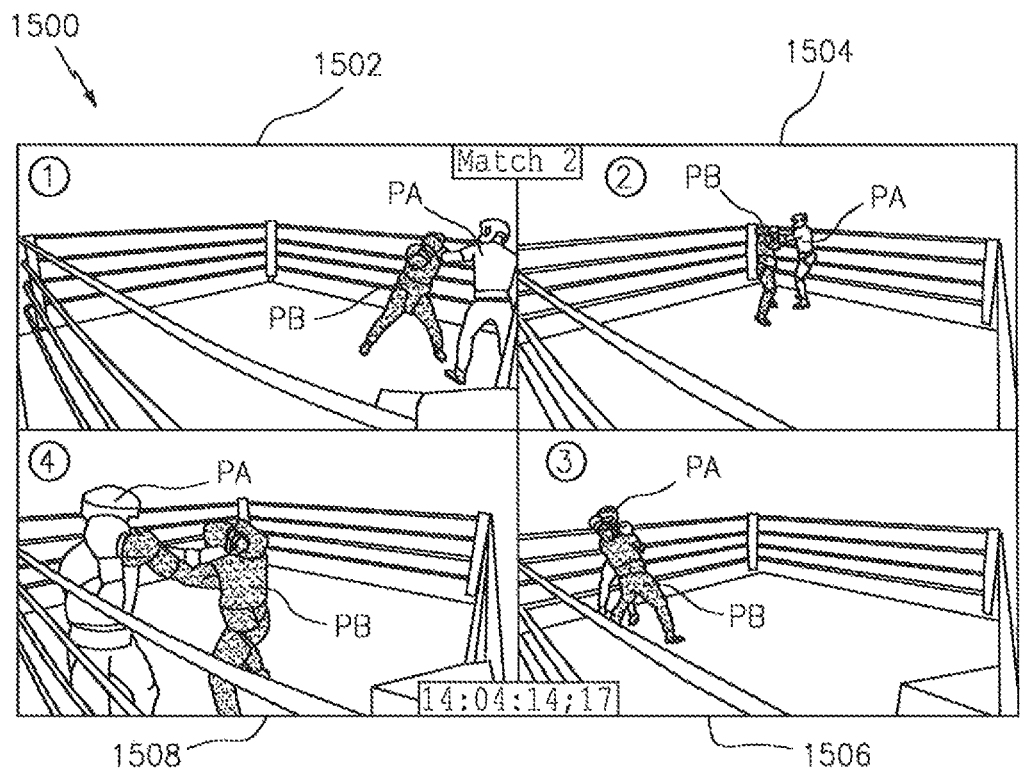
FIG. 15A shows simultaneous images from four (4) ICUs (one in each corner of a boxing ring) for a given image frame time, in accordance with embodiments of the present disclosure.

FIG. 15A shows a collage (or set) 1500 of four (4) simultaneous images 1502-1508, representing four (4) different views from a corresponding four (4) ICUs, one ICU located at each corner of a square boxing ring, for a given image frame time. In particular, an upper left image 1502, an upper right image 1504, a lower right image 1506, and a lower left image 1508 are shown, all four images 1502-1508 being captured at a time 14:04:14;17. Also, image 1508 is taken from a corner of the ring closest to the boxers at that time. Each of the image views 1502-1508 shows two boxers (or players) in the ring, a first boxer Player A (PA) and a second boxer Player B (PB), shown from the four different views 1502-1508 at the same time. In each view, different body parts of the players PA,PB are visible. For example, in image views 1502,1504,1508, the players' body parts are mostly visible from one side of the players; however, in image view 1506, Player A (PA) is mostly blocked by the body of Player B (PB), for that image frame. In that case, the data associated with image views 1502,1504,1508 from the respective three ICUs (e.g., ICU1, ICU2, and ICU4) may be used to determine many of the Body Part Labels (BPLs) of the Players PA,PB.

Figure 15B:
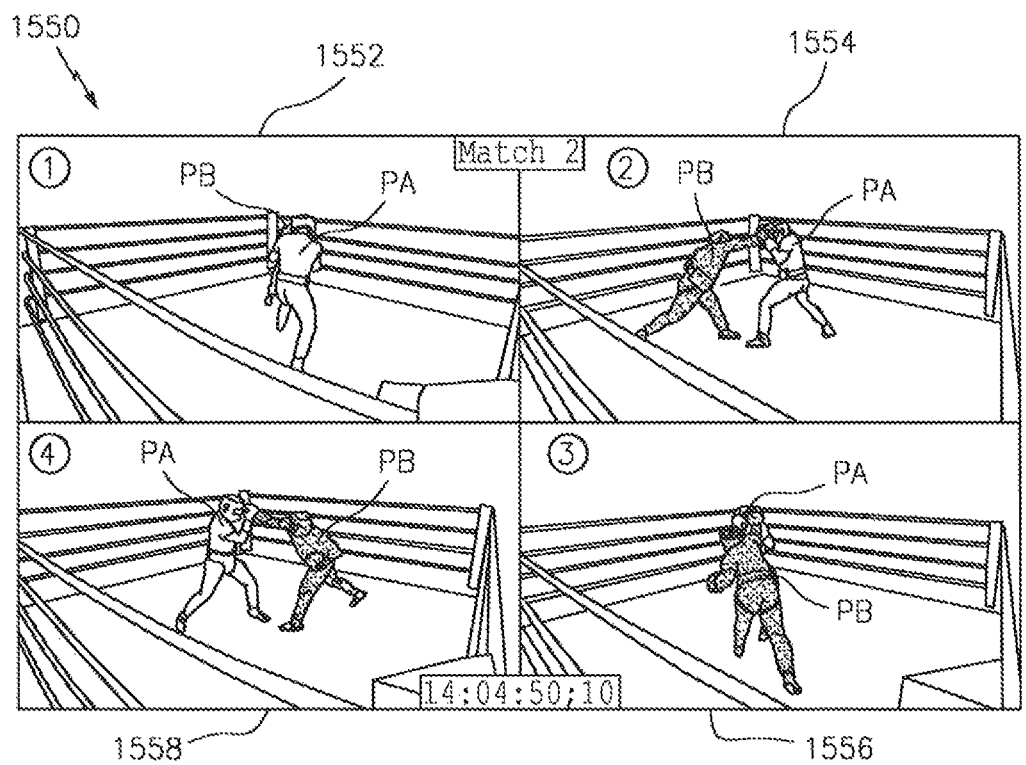
FIG. 15B shows simultaneous images from four (4) ICUs (one in each corner of a boxing ring) for another given image frame time, in accordance with embodiments of the present disclosure.

FIG. 15B, is similar to FIG. 15A taken at a later time, and shows a collage (or set) 1550 four (4) simultaneous images 1552-1558, representing four (4) different views from a corresponding four (4) ICUs, one ICU located at each corner of the square boxing ring. In particular, an upper left image 1552, an upper right image 1554, a lower right image 1556, and a lower left image 1558 are shown, all four images 1552-1558 being captured at a time 14:04:50;10. Each of the image views 1552-1558 shows the two boxers Player A (PA) and Player B (PB), shown from the four different views 1552-1558 at the same time. As in FIG. 15A, in each view, different body parts of the players PA,PB are visible. For example, in image views 1554,1558, the players' body parts are mostly visible from one side of the players; however, in image view 1552, Player B (PB) is mostly blocked by the body of Player A (PA), and in image view 1556, Player A (PA) is mostly blocked by the body of Player B (PB), for that image frame. In that case, the data associated with image views 1554,1558 from the respective two ICUs (e.g., ICU2 and ICU4) may be used to determine many of the Body Part Labels (BPLs) of the Players PA,PB that are visible from these two ICUs.

Figure 16:
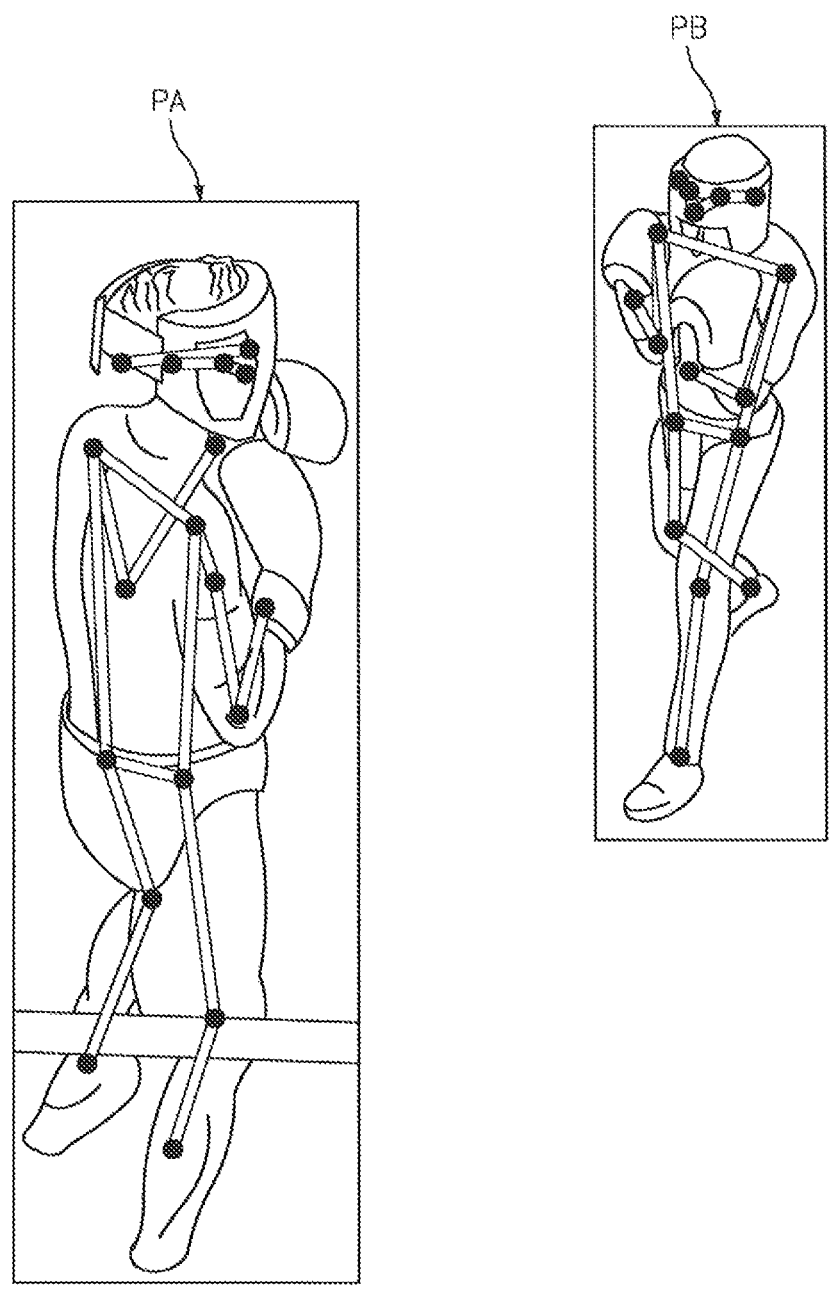
FIG. 16 shows images of two players (Player A and Player B) showing Body Part Label Joints (BPL-Js) and connecting lines, in accordance with embodiments of the present disclosure.

Referring to FIG. 16, images are shown of two players Player A (PA) and Player B (PB) showing 17 Body Part Label Joints (BPL-Js) and connecting lines therebetween superimposed on images of the Players PA,PB. In particular, it shows five (5) points for each head and the remaining twelve (12) points for the main joints of each player (making up the 17 BPL-Js). More specifically, FIG. 16 shows the boxes around the two Players PA,PB, that were captured by the Player ID Logic 204 (FIG. 2), e.g., using YOLO/Mask R-CNN, as discussed herein, as well as the 17 BPL-Js from the Pose Estimation Model Logic 206 (FIG. 2), e.g., using HRNet, as discussed herein.

In some embodiments, the present disclosure may be used with 2D greyscale images data instead of full color (RGB) image data. In that case, the 2D image data from the ICU may be a single greyscale value indicative of the shade of grey for that pixel, instead of three separate values (or channels) R,G,B (red, green, blue) indicative of full color for that pixel.

Also, the present disclosure will work with any sporting event or other scene/event having one or more players (or people) where occlusions or visibility of body parts is a challenge. In particular, the present disclosure may be used in sports or non-sports scenes or applications, or any application where the identification and location of body parts of one or more people in an image or scene are to be determined, or performance metrics or the like for such body parts are desired to be calculated or determined.

Any other models for identifying people or players in an image or scene and identifying the body part labels of the people may be used if desired. Also, in some embodiments, the Player ID Logic 204 and Pose Estimation Model Logic 206 may be implemented using a single model, logic or software application, which receives the 2D/3D data from each ICU and provides the body parts (e.g., 17 BPL-Js or other body parts) of the desired player(s). Also, in some embodiments, the present disclosure may identify, analyze, or determine the body parts and metrics of a single player (or person) or more than two players (or people), provided a sufficient number of ICUs are provided at the appropriate locations to identify the desired body parts of the desired player(s).

Also, instead of using the centroids (BPL-Cs) described herein with FIG. 9 to calculate Player metrics, any other body parts from the Players may be used to determine Player metrics, if desired, such as the main joints from the 17 BPL-Js or other body parts. In addition, other Confidence Level (CL) values than 0.9 (or 90% confidence) may be used if desired for the acceptable confidence level for determining visibility of a body part or for performing the functions described herein may be used if desired, provided it provides the desired acceptable level of visibility of the desired body parts. Also, different CL values may be used for different body parts, if desired.

Also, in some embodiments, the present disclosure may use the transformed, averaged body parts (or collection of pixels making up each body part or the entire body) to provide a partial or complete pose or view of the players in the scene for any frame in the video, viewed from a "virtual" (or reconstructed) ICU, viewing from any desired location in the scene, indicative of the views from all the ICUs combined into a single image.

The system, computers, servers, devices, logic and the like described herein have the necessary electronics, computer processing power, interfaces, memory, hardware, software, firmware, logic/state machines, databases, microprocessors, communication links (wired or wireless), displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, functions, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for providing multi-camera, 3D body part labeling and performance metrics, comprising:
receiving 2D image data and 3D depth data from a plurality image capture units (ICUs), each of the 2D image data and the 3D depth data indicative of a sports scene viewed by the ICUs, the sports scene having a plurality of people, each ICU viewing the people from a different viewing position;
identifying two players to be analyzed for performance from the plurality of people in the sports scene for each ICU, using the 2D image data for each ICU and using a person detection model;
determining 3D location data and a visibility confidence level for a predetermined number of body parts for each of the two identified players from each ICU, using the 3D depth data from each ICU and using a pose estimation model;
transforming the 3D location data for the body parts for each of the two players from each ICU to a common reference frame, for body parts having the confidence level of at least a predetermined acceptable confidence level, to create visible 3D body part common location data for the body parts for each ICU;
averaging the visible 3D body part common location data for the body parts for each of the two players from each ICU, to create averaged 3D body part common location data; and
determining a performance metric of at least one of the body parts for at least one of the two players using the averaged 3D body part common location data.

2. The method of claim 1, wherein the identifying the players in the sports scene comprises identifying two closest players to each ICU and identifying predetermined pixel descriptors for each player.

3. The method of claim 1, wherein the body parts comprises body part joints comprising main joints and at least one head point.

4. The method of claim 3, wherein the predetermined number of body part joints comprise 12 main joints and 5 head points.

5. The method of claim 1, wherein the averaged 3D body part common location data for the two players comprises a predetermined number of body part centroids, as averaged 3D centroid location data.

6. The method of claim 5, wherein the body part centroids comprises at least 14 body part labels.

7. The method of claim 1, further comprising tracking the averaged 3D location data for the body parts for the two players from a prior image frame to a current image frame.

8. The method of claim 7, wherein the averaged 3D body part common location data for the two players comprises a predetermined number of body part centroids, and wherein the tracking comprises tracking the averaged 3D centroid location data for the body parts.

9. The method of claim 8, wherein the tracking comprises assigning each of the body part centroids to the appropriate player of the two players using the averaged 3D centroid location data from the prior image frame and the current image frame.

10. The method of claim 1, wherein the plurality of ICUs comprises at least four ICUs.

11. The method of claim 1, wherein the scene comprises a combat sport played in a ring, comprising at least one of: boxing, martial arts, mixed martial arts, and kick boxing.

12. The method of claim 1, wherein the different viewing position comprises positions around a perimeter of a sports arena.

13. The method of claim 1, wherein each ICU comprises a 2D camera providing the 2D image data and a 3D depth sensor providing the 3D depth data, the 2D image data and 3D depth data being associated with each pixel in an image frame.

14. The method of claim 1, wherein the predetermined acceptable confidence level is at least 90%.

15. The method of claim 1, wherein the person detection model provides people pixel boxes around each person in the image.

16. The method of claim 1, wherein the person detection model comprises YOLO (You Only Look Once).

17. The method of claim 1, wherein the person detection model comprises YOLO (You Only Look Once) and Mask-R-CNN (Regional Convolutional Neural Network).

18. The method of claim 1, wherein the pose estimation model comprises HRNet (High Resolution Net).

19. The method of claim 1, wherein the pose estimation model provides at least one pixel location for a given body part, which corresponds to the 3D location data for the given body part using the at least one pixel location.

20. The method of claim 1, wherein the transforming from the ICU reference frame to the common reference frame comprises performing a translation transform and a rotation transform.

21. The method of claim 1, wherein the performance metric comprises velocity.

22. The method of claim 1, wherein the performance metric comprises at least one of: velocity, location, pose, power, contact between objects/body parts, energy transferred upon contact, balance, positioning, "effective aggression", and "ring generalship".

23. The method of claim 1, further comprising identifying body areas for the two players for each ICU, using the 2D image data for each ICU using the person detection model; receiving a body orientation of the two players from the pose estimation model, and wherein a visibility state is determined using the 3D location data, the 3D joint location data, the body orientation of a corresponding one of the two players, and the body areas.

24. A method for providing multi-camera, 3D body part labeling and performance metrics, comprising:
receiving 2D image data and 3D depth data from a plurality image capture units (ICUs), each of the 2D image data and the 3D depth data indicative of a sports scene viewed by the ICUs, the sports scene having a plurality of people, each ICU viewing the people from a different viewing position;
identifying from the plurality of people, two closest players to each ICU in the sports scene for each ICU, using the 2D image data for each ICU and using a person detection model;
determining 3D location data and a confidence level for a predetermined number of body parts for each of the two closest players from each ICU, using the 3D depth data from each ICU and using a pose estimation model, including a confidence level for each of the body parts;
transforming the 3D location data for the body parts for each of the two closest players from each ICU to a common reference frame, for body parts having the confidence level of at least a predetermined acceptable confidence level, to create visible 3D body part common location data for the body parts for each ICU;
averaging the visible 3D body part common location data for the body parts for each of the two closest players from each ICU, to create averaged 3D body part common location data;
tracking the averaged 3D body part common location data for the body parts for the two closest players from a prior image frame to a current image frame; and
determining a performance metric of at least one of the body parts for at least one of the two closest players using the averaged 3D body part common location data.

25. The method of claim 24 wherein the identifying the players in the sports scene comprises identifying predetermined pixel descriptors for each player.

26. The method of claim 24, wherein the body parts comprises body part joints comprising main joints and at least one head point.

27. The method of claim 24, wherein the averaged 3D body part common location data for the two closest players comprises a predetermined number of body part centroids, to create averaged 3D centroid location data.

28. The method of claim 27, wherein the tracking comprises assigning each of the body part centroids to the appropriate player of the two closest players using the averaged 3D location data from the prior image frame and the current image frame.

29. The method of claim 24, wherein the plurality of ICUs comprises at least three ICUs.

30. The method of claim 24, wherein the sports scene comprises a combat sport played in a ring, comprising at least one of: boxing, martial arts, mixed martial arts, and kick boxing.

31. The method of claim 24, wherein each ICU comprises a 2D camera providing the 2D image data and a 3D depth sensor providing the 3D depth data, the 2D image data and 3D depth data being associated with each pixel in an image frame.

32. The method of claim 24, wherein the person detection model comprises YOLO (You Only Look Once) and Mask-R-CNN (Regional Convolutional Neural Network) and the pose estimation model comprises HRNet (High Resolution Net).

33. The method of claim 24, wherein the pose estimation model provides at least one pixel location for a given body part, which corresponds to the 3D location data for the given body part using the at least one pixel location.

34. The method of claim 24, wherein the transforming from the ICU reference frame to the common reference frame comprises performing a translation transform and a rotation transform.

35. The method of claim 24, wherein the performance metric comprises at least one of: velocity, location, pose, power, contact between objects/body parts, energy transferred upon contact, balance, positioning, "effective aggression", and "ring generalship".

36. A method for providing multi-camera, 3D body part labeling and performance metrics, comprising:
receiving 2D image data and 3D depth data from a plurality image capture units (ICUs) each of the 2D image data and the 3D depth data indicative of a scene viewed by the ICUs, the scene having at least one person to be analyzed in the scene, each ICU viewing the at least one person from a different viewing position;
determining 3D location data and a visibility confidence level for a predetermined number of body parts for the at least one person from each ICU, using the 2D image data and the 3D depth data from each ICU;
transforming the 3D location data for the body parts for the at least one person from each ICU to a common reference frame, for body parts having the confidence level of at least a predetermined acceptable confidence level, to create visible 3D body part common location data for the body parts for each ICU;
averaging the visible 3D body part common location data for the body parts for the at least one person from each ICU, to create averaged 3D body part common location data; and
determining a performance metric of at least one of the body parts for the at least one person using the averaged 3D body part common location data.

37. The method of claim 36, further comprising identifying the at least one person using the 2D image data for each ICU and using a person detection model.

38. The method of claim 36 further comprising tracking the averaged 3D body part common location data for the at least one person from a prior image frame to a current image frame.

39. The method of claim 36, wherein the plurality of ICUs comprises at least four ICUs.

40. The method of claim 36, wherein the at least one person comprises a player and the scene comprises a sports scene.

* * * * *